United States Patent
Moshir et al.

(10) Patent No.: US 7,920,851 B2
(45) Date of Patent: Apr. 5, 2011

(54) SECURE MOBILE INFORMATION MANAGEMENT SYSTEM AND METHOD

(75) Inventors: Sean Moshir, Scottsdale, AZ (US); Kevin K. Moshir, Scottsdale, AZ (US); Houman Shafiezadeh, Scottsdale, AZ (US)

(73) Assignee: CellTrust Corporation, Scottsdale, AZ (US)

(*) Notice: Subject to any disclaimer, the term of this patent is extended or adjusted under 35 U.S.C. 154(b) by 945 days.

(21) Appl. No.: 11/807,024

(22) Filed: May 25, 2007

(65) Prior Publication Data
US 2007/0293202 A1 Dec. 20, 2007

Related U.S. Application Data

(60) Provisional application No. 60/809,052, filed on May 25, 2006, provisional application No. 60/920,603, filed on Mar. 29, 2007.

(51) Int. Cl.
*H04M 3/493* (2006.01)

(52) U.S. Cl. ................ 455/414.2; 455/414.1; 455/418; 455/419; 455/435.2; 455/422.1; 709/227; 709/217; 709/219

(58) Field of Classification Search ............... 455/414.2, 455/557, 418–419, 414.1, 435.2, 422.1, 41.2; 709/227, 217, 219
See application file for complete search history.

(56) References Cited

U.S. PATENT DOCUMENTS

| | | | |
|---|---|---|---|
| 5,436,960 | A | 7/1995 | Campana et al. |
| 5,625,670 | A | 4/1997 | Campana et al. |
| 5,819,172 | A | 10/1998 | Campana et al. |
| 6,067,451 | A | 5/2000 | Campana et al. |
| 6,317,592 | B1 | 11/2001 | Campana et al. |
| 6,493,758 | B1 * | 12/2002 | McLain ............ 709/227 |
| 6,510,325 | B1 | 1/2003 | Mack et al. |
| 6,769,607 | B1 | 8/2004 | Pitroda et al. |
| 6,871,063 | B1 | 3/2005 | Schiffer |
| 6,988,657 | B1 | 1/2006 | Singer et al. |
| 7,012,503 | B2 | 3/2006 | Nielsen |
| 7,050,945 | B2 | 5/2006 | Oba et al. |

(Continued)

FOREIGN PATENT DOCUMENTS
EP 1657944 5/2006
(Continued)

OTHER PUBLICATIONS

Lauri Giesen, "Near-Field Dreams," http://www.digitaltransactions.net/files/Cover0306.doc.
Chen et al., "Short-range Wireless Technologies with Mobile Payments Systems," http://doi.acm.org/10.1145/1052220.1052302.
Noll et al., "Business through Mobile Phone initiated Near Field Commumication," http://jnoll.homelinux.org/jnoll/ref/200505NUf-NFC-Mobile-Noll-Calvet.pdf.

(Continued)

*Primary Examiner* — Charles N Appiah
*Assistant Examiner* — Michael T Vu
(74) *Attorney, Agent, or Firm* — Tiffany & Bosco, P.A.

(57) ABSTRACT

Information or items that otherwise might be carried in a person's wallet or purse may be managed and stored on a mobile phone. Embodiments include a software application loaded on a mobile phone and an Internet website through which certain information can be transmitted to the phone by the user, third parties, or both. A user may be alerted to certain information or changes in information that meet certain criteria. The website may provide secure storage for information, filter information, and send encrypted and compressed nuggets or fractions of information to the phone for storage based on topic. E-mails may be searched for information, information may be sent to different parties, and signals may be sent locally to exchange information. Personal information may include account information or travel information, for example.

22 Claims, 6 Drawing Sheets

U.S. PATENT DOCUMENTS

| | | | |
|---|---|---|---|
| 7,248,895 B2 * | 7/2007 | Shiraogawa et al. | 455/557 |
| 2002/0016175 A1 | 2/2002 | Marce et al. | |
| 2002/0088853 A1 | 7/2002 | Itoh et al. | |
| 2002/0107745 A1 | 8/2002 | Loeser | |
| 2002/0161476 A1 | 10/2002 | Panofsky et al. | |
| 2002/0165926 A1 | 11/2002 | Rensin et al. | |
| 2002/0186845 A1 | 12/2002 | Dutta et al. | |
| 2003/0022655 A1 | 1/2003 | Bogat | |
| 2003/0115288 A1 | 6/2003 | Ljubicich et al. | |
| 2003/0224766 A1 | 12/2003 | Stockhammer | |
| 2004/0117262 A1 | 6/2004 | Berger et al. | |
| 2004/0127256 A1 | 7/2004 | Goldthwaite et al. | |
| 2004/0147270 A1 | 7/2004 | Petrovich | |
| 2005/0064814 A1 | 3/2005 | Matsuo et al. | |
| 2005/0086261 A1 | 4/2005 | Mammone | |
| 2005/0160062 A1 | 7/2005 | Howard et al. | |
| 2005/0187873 A1 | 8/2005 | Labrou et al. | |
| 2005/0187882 A1 | 8/2005 | Sovio et al. | |
| 2005/0192008 A1 * | 9/2005 | Desai et al. | 455/435.2 |
| 2005/0222961 A1 | 10/2005 | Staib et al. | |
| 2005/0238149 A1 | 10/2005 | De Leon | |
| 2005/0250538 A1 | 11/2005 | Narasimhan et al. | |
| 2006/0043201 A1 | 3/2006 | Vesikivi et al. | |
| 2006/0052055 A1 | 3/2006 | Rowse et al. | |
| 2006/0080232 A1 | 4/2006 | Epps | |
| 2006/0120348 A1 | 6/2006 | Croak et al. | |
| 2006/0240806 A1 | 10/2006 | Demirbasa et al. | |
| 2006/0240809 A1 | 10/2006 | Yu | |
| 2007/0032225 A1 | 2/2007 | Konicek et al. | |
| 2007/0129113 A1 | 6/2007 | Klicpera et al. | |
| 2007/0224980 A1 | 9/2007 | Wakefield | |
| 2008/0014869 A1 | 1/2008 | Demirbasa et al. | |

FOREIGN PATENT DOCUMENTS

| | | |
|---|---|---|
| FR | 2863811 | 6/2005 |
| GB | 2399670 | 9/2004 |
| JP | 2002-279320 | 9/2002 |

OTHER PUBLICATIONS

James Lee, "NFC (Near Field Communication) technology + mobile phones=Interesting potential uses," http://jnoll.homelinux.org/jnoll/ref/200505NUf-NFC-Mobile-Noll-Calvet.pdf.

Cellit Mobile Management, "House4Cell," http://www.house4cell.com, p. 1-2.

Cellsigns, Inc., "Cellsigns get mobile," http://www.cellsigns.com, p. 1-4.

Cellsigns, Inc., "Mobile Agent—Mobile Search for Real Estate," http://www.cellsigns.com/mobileagent/index.shtml, p. 1-2.

Sharp, Duncan Scott. "Adapting Ad Hoc Network Concepts to Land Mobile Radio Systems." Masters Thesis submitted to Simon Fraser University. Published Dec. 2002. [retrieved on May 16, 2008]. Retrieved from the Internet: <URL:http://www.ensc.sfu.ca/~ljilja/cnl/pdf/duncan.pdf>.

Written Opinion of the Int'l Searching Authority; Int'l Search Report. Jun. 26, 2008, p. 1-10 for PCT International Application No. PCT/US08/55494.

Written Opinion of the Int'l Searching Authority; Int'l Search Report. Feb. 15, 2008, p. 1-14 for PCT International Application No. PCT/US07/12436.

Phonefactor News. Two-Factor Authentication Without Tokens: Positive Networks Debuts PhoneFactorTM, May 22, 2007, http://www.phonefactor.com/news/tow-factor-authentication-without-tokens-positive-networks, p. 1-4, Overland, Park. KS.

Realwire From WEBITPR, Clickatell Partners with RSA, The Security Division of EMC, to Provide Global Enterprise Customers with On-Demand Authentication using Cell Phones, May 27, 2008, http://www.webitpr.com/release_detail.asp?ReleaseID=8755, p. 1, Redwood City, CA.

* cited by examiner

SECURE MOBILE INFORMATION MANAGEMENT SYSTEM AND METHOD

RELATED APPLICATIONS AND CLAIM OF PRIORITY

This patent application claims priority to, and incorporates by reference, U.S. provisional patent application 60/809,052, titled: MOBILE INFORMATION MANAGEMENT SYSTEM AND METHOD, which was filed on May 25, 2006, and U.S. provisional patent application 60/920,603, titled: SECURE MOBILE INFORMATION MANAGEMENT SYSTEM AND METHOD, which was filed on Mar. 29, 2007. Both of these provisional patent applications have the same inventors as this application. This patent application is also related to a PCT patent application, filed on the same date, having the same inventors, and having the same title, as this application, which is also incorporated herein by reference.

FIELD OF INVENTION

This invention relates to systems and methods for managing information, including personal information, and for storing such information in a retrievable manner capable of being conveniently carried on a user's person. Specific embodiments of this invention relate to wireless communication, cellular telephony, Internet-based systems and methods, software, computers, or a combination thereof.

BACKGROUND OF THE INVENTION

In the past, people have carried many different items in their wallets or purses, for example. Certain of these items store personal information, provide identification for various purposes, allow the person to make purchases, provide proof of particular facts, or a combination thereof. Certain items that have been carried in wallets include credit cards, bank cards, debit cards, check books, bank books, bank account records, credit card records, bills, identification cards, licenses such as a driver's license, CDL, pilot's license, etc., social security cards, voter registration cards, passports, visas, immigration cards, loyalty cards, e.g., for grocery stores such as SAFEWAY, and ALBERTSONS, retail stores such as GAP, and STARBUCKS, membership cards such as COSTCO, REI, gyms, and country clubs, frequent flyer program cards or numbers, rewards programs, video clubs, library cards, insurance cards, such as health, auto, home, and life insurance, login and password information, elevator cards, parking structure cards, room keys, phone numbers, e-mail and street addresses, calendars, calling cards, medical information such as medical history, drugs being taken, immunization records, living wills, medical power of attorney, emergency contact information, personal photographs, personal memorabilia, receipts, proof of warranties and warranty information, tax records, proof of professional credentials, proof of authority, and business cards, as examples.

In the past, people have also carried mobile phones, which, besides being used to place and receive calls, have contained information such as phone numbers and calendars, and some of which have had Internet access. Mobile phones typically include processors, digital storage, displays, and software, among other things, and many hold and display photographs, provide for purchases on the Internet, include a global positioning system (GPS) or a combination thereof. Further, systems and methods have been developed to manage various information and activities including personal information. Various such systems and methods are computer implemented, involve computer software, utilize computer storage databases, are network or Internet based, or a combination thereof, as examples. Still further, bar codes, near field communication (NFC) and Bluetooth communication, among other technologies, have been used to communicate with electronic devices of certain types. Even further, personal digital assistants (PDAs), such as the BLACKBERRY have been used to send and receive e-mails, as well as placing and receiving telephone calls, although, in the past, users of PDAs have typically had to sort through a large number of e-mails to find particular information that they needed or desired.

However, needs and the potential for benefit exist in the area of such information and item management, and these needs and potential for benefit often extend to many types of personal, business, and professional information. For instance, people often have many things that they would like to place in their wallets, and people must often choose between competing items to carry. Further, wallets and purses are often too large or bulky to carry conveniently, particularly when people are wearing particular styles of clothing. Thus, needs and potential for benefit exist for systems and methods that reduce the number of items that need to be carried in a wallet or that increase the amount of information that can be carried on one's person. In addition, there is a need and potential for benefit to be able to efficiently identify, replace, cancel, or destroy items or information, for example, of the type carried in a wallet or purse, if the wallet, purse, or one or more items is lost, stolen, damaged, or destroyed.

Furthermore, needs and potential for benefit, exist for a person to be able to use the Internet, or otherwise provide for efficient communication, entering of data, and transferring of data, but needs also exist that an acceptable level of data security be maintained with such systems and methods. Further needs and areas for potential for improvement include improving the availability of information from a number of different sources, reducing duplication in the entering of information, organizing information and providing information in a more-usable form, more effectively transferring information between a storage device and another device, and providing more information, more up-to-date information, or both, to a user. Further needs and areas for potential for improvement include updating information, for example, in a timely manner or in real time, and providing notifications or alarms, at least for particularly important information.

In specific examples, needs and potential for benefit exist in the areas of methods and systems for managing information for a number of users, using the Internet and mobile phones of the users. Particular needs and potential for benefit exist for such systems and methods that receive information from users, that include a criteria for alarming, that receive information from one or more third parties, that select a fraction of the information from third parties, that transmit this fraction of the information to the mobile phones of the users, where the information is organized in a manner that it is accessible to the users. Additional needs and potential for benefit exist for certain processes to be repeated, and for alarms to be provided to the users when certain information satisfies a criteria, for example, that the users have identified. Further needs and potential for benefit exist for software modules operating on servers and on mobile phones that provide for secure storage of information, that select, send, and receive nuggets of personal information, and that store the nuggets for access by the user, for example, without sorting through a number of e-mails.

In addition, in the past, various systems and methods for authorizing actions and authenticating access have existed.

For example, locks and keys have been used to control physical access to spaces (e.g., locked doors on buildings, electronic keys for hotel rooms, etc.). However, people had to carry such keys to obtain access. Passwords and pass codes have been used to authorize access to controlled spaces, and to grant computer access to electronically stored data. However, users must remember these passwords or pass codes. Systems and methods have also existed for authorizing other actions. For example, cards have also been used to authorize financial transactions, such as payment at the point of sale for the purchase of goods or for the provision of services. Besides requiring the presence of the card, transactions have been authorized using bank card networks, which verified that the cards were authorized. Signatures have also been used to authorize transactions. However, users needed to carry the cards, and signatures have been forged.

Needs and potential for benefit exist for other or better systems and methods for authorizing such actions, or other actions, that do not require the users to carry additional cards or keys, remember additional passwords, codes, or information, that use items already carried by the users, that use items that are frequently used and controlled by the user, that are more convenient, that offer alternatives, that are easily trackable, that provide an ability to authorize a variety of different actions, that cannot easily be forged, or a combination thereof.

Systems and methods have also existed to track individuals. For example, devices have been used to track prisoners who have been placed under house arrest that are locked onto the prisoners and alarm when a prisoner travels more than a predetermined distance from their home. Devices have also been used to track vehicles, including using GPS technology, to aid in recovery if the vehicles are stolen. However, needs and potential for benefit exist for systems and methods that track individuals without using such devices, for particular applications. As an example, needs and potential for benefit exist for systems and methods that track individuals by tracking their mobile phones. As a further example, needs and potential for benefit exist for tracking individuals, including children, for their own protection.

In a particular example, in the past, convicted sex offenders have been required to register where they reside and such information has been made available to the public, including via the Internet, so that members of the public can take steps to protect themselves and their children, as examples, from potential future sexual predation. However, many registered sex offenders often reside in densely populated areas, making it difficult for members of the public to keep track of all of them. In addition, parents are not always aware of exactly where there children are at all times. Thus, needs and potential for benefit exist for systems and methods that alert parents or guardians of children when the children enter or travel within a predetermined distance of the residence of a registered sex offender. Needs and potential for benefit also exist for systems and methods that provide positional awareness of particular individuals for other purposes, including such systems and methods that use mobile phones.

Potential for improvement exists in these and other areas that may be apparent to a person of skill in the art having studied this document.

SUMMARY OF PARTICULAR EMBODIMENTS
OF THE INVENTION

This invention provides, among other things, a number of embodiments of systems and methods of storing or making available information, items, functionality, or a combination thereof, in a mobile phone. In certain embodiments, information or items that otherwise might be carried in a person's wallet or purse may be stored on a mobile phone. Various embodiments include a software application loaded on a mobile phone that stores certain information for access by the user. In addition, various embodiments of the invention include an Internet website through which certain information can be transmitted to the phone. In some embodiments, the information on the website can be updated through the phone, by the user through a personal computer, or both. Furthermore, in some embodiments, various third parties, such as merchants, businesses, banks, airlines and the like may provide information to the website. Information may be transmitted from the website to the phone, or vice versa, via a telephone signal or through a mobile telephone network, for example, at particular times or as needed. In some embodiments, a user may be alerted to certain information or changes in information that meet certain criteria.

Various embodiments of the invention provide as an object or benefit that they partially or fully address one or more of the needs, potential areas for benefit or improvement, and functions described herein, for instance. The present invention provides various embodiments that may store or make available information, items, or functionality in a mobile phone. Various embodiments may provide a higher level of data security, be easier to use, accomplish more functions, contain more useful information, provide a better level of control, provide easier management and replacement if lost or stolen, or a combination thereof, in comparison with various prior art. Various embodiments may, for example, manage personal information for a number of users, sort certain information, provide alarms, transfer information between a server and mobile phones, and store information on mobile phones in a manner that facilitates access by the users. Further features and advantages of the invention may be apparent to those skilled in the art.

In particular embodiments, this invention provides, for example, systems of managing personal information for a plurality of users, each user having a mobile phone operating on a mobile phone network. In particular embodiments, the system includes at least one first software module operating on at least one server and forming at least one website wherein a plurality of users visit the website through the Internet and elect to have their personal information managed through the system using their mobile phones. In addition, in these embodiments, the first software module provides secure storage for each user's personal information received from the user and from at least one third party acting on behalf of the user to provide information to the user, and the first software module filters the personal information and selects nuggets of the personal information which the first software module sends to the mobile phone. Furthermore, such systems also include a second software module operating independently on at least a plurality of the mobile phones, and the second software module is configured to receive the nuggets of the personal information of the user from the first software module through the Internet and through the mobile phone network, and to store the personal information on the mobile phone so that the personal information may later be accessed by the user even when the mobile phone is not connected to a mobile phone network, by viewing a folder containing nuggets organized by subject matter.

In some such embodiments, for at least a plurality of the users, the second software module is downloadable by users from the first software module to the mobile phones through the website and through the mobile phone network. In addition, in some embodiments, for at least a plurality of the users, the first software module includes instructions to search at least a plurality of e-mails for keywords, identifying numbers, or both, and to select the nuggets of the personal information from the e-mails using the keywords or identifying numbers. In some such embodiments, for at least a plurality of the users, the first software module contains instructions to receive a command from the user through the mobile phone network to dispute a financial transaction for a particular account described in the nuggets of the personal information, and upon the receipt of the command, to communicate or transmit a dispute of the transaction to a manager of the particular account, for example, through the Internet.

Furthermore, in some embodiments, for at least a plurality of the users, the second software module contains instructions to allow the user to select at least a portion of the personal information that is stored on the mobile phone, select or enter an identifier of a different party, a different party mobile phone, or both, and elect to send the (at least a) portion of the personal information to the different party mobile phone. In many embodiments, for at least a plurality of the users, the first software module further contains instructions to evaluate whether the different party mobile phone contains a copy of the second software module, and if the different party mobile phone contains a copy of the second software module, then to send the (at least a) portion of the personal information to the copy of the second software module on the different party mobile phone through the mobile phone network. In some such embodiments, for at least a plurality of the users, the first software module further contains instructions to receive a command from the user through the mobile phone network, and upon the receipt of the command, to transmit at least a portion of the nuggets of the personal information to a different party through the Internet.

In other embodiments, the invention provides various methods of managing information for at least a plurality of users using the Internet and mobile phones of the users. In a particular such embodiment, the method includes for each of a plurality of the users, (in any order) receiving a first set of personal information of the user from the user through the Internet, the mobile phone of the user, or both, wherein the first set of personal information includes identification of a criteria for alarming, and for each of a plurality of the users, receiving a second set of personal information of each user from at least one third party through a network. In this embodiment, the method also includes, for each of a plurality of the users, selecting a fraction of the second set of personal information, and for each of a plurality of the users, transmitting the fraction of the second set of personal information to the user's mobile phone through the mobile phone network for storage on the user's mobile phone using a second software module residing on the phone. Furthermore, in this embodiment, the second software module organizes the fraction of the second set of personal information and makes the fraction of the second set of personal information accessible to the user. This embodiment also includes, for each of a plurality of the users, repeating at least a plurality of times the receiving of the second set of personal information, the selecting of the fraction, and the transmitting of the fraction. And this method also includes, for each of a plurality of the users, using the second software module, providing an alarm to the user if at least a portion of the fraction of the second set of personal information satisfies the criteria.

Another embodiment of such a method includes receiving a first set of personal information of the user from the user through the Internet or through the mobile phone of the user (or both), and upon instruction by the user, downloading a second software module to the user's mobile phone through the mobile phone network. This embodiment also includes receiving a second set of personal information of the user from at least one third party through a network. This embodiment further includes selecting a fraction of the second set of personal information, encrypting the fraction of the second set of personal information, and transmitting the fraction of the second set of personal information to the user's mobile phone through the mobile phone network for storage on the user's mobile phone using the second software module residing on the phone. Further, this embodiment includes decrypting the fraction of the second set of personal information, and using the second software module residing on the phone, organizing the fraction of the second set of personal information based on topic, as well as using the second software module residing on the phone to make the fraction of the second set of personal information accessible to the user based on the topic of the information. Even further, this embodiment includes repeating at least a plurality of times the receiving of the second set of personal information, the selecting of the fraction, the encrypting of the fraction, the transmitting of the fraction, the decrypting of the fraction, the organizing of the fraction, and the making the fraction accessible to the user, and the repeating further includes synchronizing at least a portion of the fraction of the second set of personal information that is stored on the user's mobile phone with corresponding personal information that was already stored on the mobile phone, while maintaining the organization of the information based on the topic of the information.

In various embodiments of either of these methods, for each of a plurality of the users, the first set of personal information includes an identification of at least one financial account, the second set of personal information includes an identification of deposits into the account, withdrawals from the account, and a balance of the account, and the providing an alarm includes (or an alarm is provided that includes) alarming if a withdrawal exceeds a first threshold identified within the criteria, alarming if the balance of the account drops below a second threshold identified within the criteria, or both. Further, in some of these methods, for each of a plurality of the users, the first set of personal information includes travel information, an identification of a common carrier or a travel agent, or a combination thereof, the second set of personal information includes identification of a departure time and a departure location, and the providing of an alarm includes (or an alarm is provided that includes) alarming if there is a change in the departure time, the departure location, or both.

In many embodiments the method further includes, for each of a plurality of the users, using local signal transmitting hardware located on the user's mobile phone, and using the second software module, under the control of the user, transmitting a local signal includes at least a portion of the first set of personal information or the second set of personal information (or both) to a reader within proximity to the mobile phone. Further, in particular embodiments, for each of a plurality of the users, the first set of personal information includes loyalty information or identification of a merchant or a service provider (or a combination thereof, the first set of personal information or the second set of personal information (or both) includes the loyalty information, the local signal includes at least a portion of the loyalty information, and the transmitting of the local signal includes transmitting the (at least a) portion of the loyalty information to the merchant, the service provider, or both. Further, in particular embodiments, the method further includes using signal receiving hardware located on the user's mobile phone, and using the second software module, under the control of the user, receiving a local signal from a transmitter within proximity to the mobile phone.

Further still, in various embodiments, the method further includes, in any order, for at least a plurality of the users, upon instruction by the user, transmitting at least a portion of the second set of personal information to a different party mobile phone through the mobile phone network for storage on the different party mobile phone, for access by the different party. In some embodiments, the method further includes, in any order, for at least a plurality of the users, upon command by the user, wherein the command is provided through the mobile phone of the user, transmitting at least a portion of the second set of personal information to a different party through the Internet. And in particular embodiments, the portion of the second set of personal information includes a travel itinerary.

Still further, in some embodiments, the method further includes, for each of a plurality of the users, before the transmitting of the fraction of the second set of personal information to the user's mobile phone, encrypting the fraction of the second set of personal information, compressing the fraction of the second set of personal information, or both and the repeating includes repeating the encrypting, compressing, or both. In some such methods, for each of a plurality of the users, the second software module organizes the fraction of the second set of personal information based on topic and makes the fraction of the second set of personal information accessible to the user based on the topic of the information.

Additionally, in many embodiments, for each of a plurality of the users, the repeating includes replacing at least a portion of the fraction of the second set of personal information that is stored on the user's mobile phone, while maintaining the organization of the information based on the topic of the information. And in various embodiments, for each of a plurality of the users, the repeating includes synchronizing at least a portion of the fraction of the second set of personal information that is stored on the user's mobile phone with corresponding personal information that was already stored on the mobile phone, while maintaining the organization of the information based on the topic of the information. And further, in many embodiments, the receiving of the first set of personal information, the receiving of the second set of personal information, the selecting of the fraction, and the transmitting of the fraction, are all performed by the first software module residing on a server connected to the Internet, wherein the first software module further forms at least one Internet website.

Figure 1:
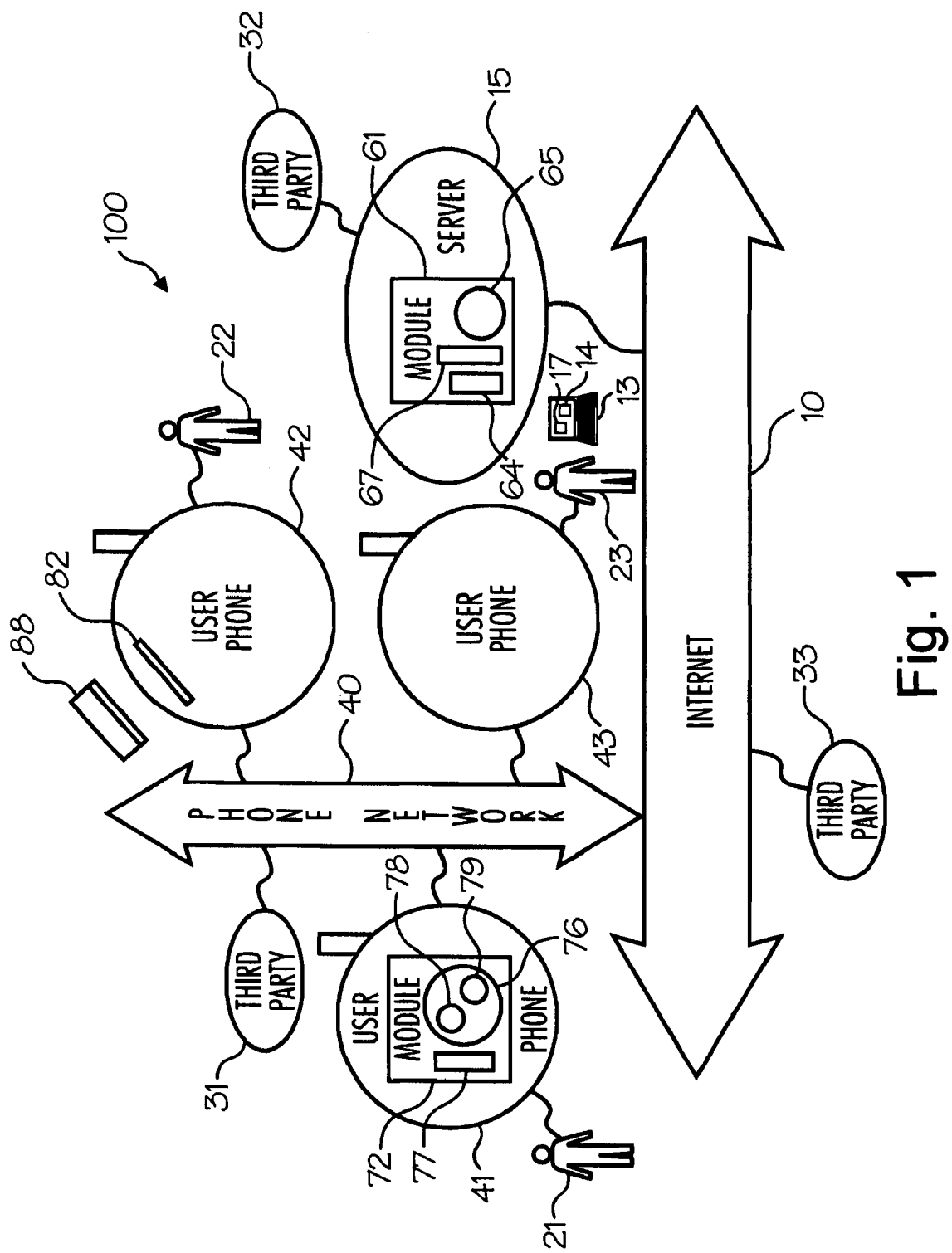
FIG. 1 is a block diagram illustrating, among other things, an example of an environment in which various embodiments of the invention may operate and various examples of systems of managing information for a number of users, illustrating examples of embodiments of the invention.

The drawings illustrate, among other things, various particular examples of embodiments of the invention, and certain examples of characteristics thereof. Different embodiments of the invention include various combinations of elements or acts shown in the drawings, described herein, known in the art, or a combination thereof.

DETAILED DESCRIPTION OF EXAMPLES OF EMBODIMENTS

Examples of embodiments of the invention include apparatuses, systems, for instance, with server modules and phone modules, and methods of managing information and providing alarms. Particular embodiments include systems of managing personal information for a plurality of users, each user having a mobile phone operating on a mobile phone network, and methods of managing information for at least a plurality of users using the internet and mobile phones of the users.

Particular embodiments include methods for authorizing actions using mobile phones. Embodiments may include acts such as receiving from a person having authority to authorize the action, an identification of a phone number for obtaining authorization for the action, and receiving from a person seeking the action a request for authorization of the action. Certain embodiments also include acts such as sending a first message through a mobile phone network to the mobile phone, including a description of the action for which authorization is requested, and receiving, from the first mobile phone, a second message, which authorizes the action. Actions that are authorized, in different embodiments, include computer access, physical access, and financial transactions, as examples. In various embodiments, the phone number may be received through the mobile phone network, through the Internet, through a local signal, or directly from the user, as examples.

Other embodiments include methods for authenticating access and providing positional awareness using mobile phones. Examples of embodiments for authenticating access include receiving identification indicia from a person seeking access, sending a message to a person having authority for access, and receiving either a second message indicating that the person has taken an affirmative action to indicate authorization, or a password that was provided in the first message. Access may be computer access or physical access, as examples. Examples of methods of providing positional awareness include obtaining or storing location coordinates, monitoring the location of a mobile phone, and providing an alarm, for example, through a second mobile phone. In a number of embodiments, location coordinates are automatically obtained from Internet websites, for example. In some embodiments, for example, parents can monitor the location of their children to make sure they do not get too close to a reported residence of a registered sex offender, for instance.

Various embodiments of the invention provide on mobile devices, items or information that might otherwise be found in a person's wallet or purse, for example. Such a mobile device may be a phone, Palm Pilot, personal digital assistant, or the like, for example. The mobile device is often referred to herein as a "phone" or "mobile phone", but it should be understood that it may have other functionality or be another type of mobile device in some embodiments. Thus, in certain embodiments, a person may be able to leave their wallet or purse behind and bring just their phone, for example, when they leave home, go shopping, go to a restaurant, travel, or the like, or their phone may provide a backup to their wallet, for instance, or vice versa. In other embodiments, a phone may provide a portion of the functionality or information found in a wallet, or may contain additional information or functionality as well.

In some embodiments, a user may be able to enter information into a website, or may authorize entry of information into the website by others, which may be transmitted to the phone automatically for storage. In addition, in some embodiments, users may be able to enter information through their phone for transfer to the website server. In various embodiments, third parties, such as airlines, financial institutions such as banks, and the like, may provide information to the website, some or all of which may be transferred to the phone. Further, in some embodiments, certain such information may provide an alert or alarm to the user, for example, regarding important information such as notification of large deposits or withdrawals, changes in flight information, location of children, etc. In various embodiments, a user may be able to view other information on the phone, on the website, or both, such as, for example, bank account balances, transaction histories, frequent flier miles, credit card bills, automatic deposits and withdrawals, insurance information, warranties, service contracts, and the like.

FIG. 1 illustrates an example of an environment in which various embodiments of the invention may operate, and also illustrates various examples of systems, including systems of managing information for a number of users. System 100 is, among other things, an example of an Internet-based system for managing information that is transferred to and stored on a mobile phone, which is accomplished in many embodiments while maintaining an acceptable level of data security. In the example of system 100, users 21, 22, and 23 own, use, or have access to mobile phones 41, 42, and 43 respectively, which are serviced through mobile phone network 40. Although one mobile phone network 40 is shown, some embodiments may include or use a number of mobile phone networks, which may be interconnected, for example. As used herein, unless specifically stated otherwise, a "mobile phone network" may be a cellular network, a WiFi system, WiMAX, or another way to network mobile phones. Further, the three users 21 to 23 and mobile phones 41 to 43 shown may serve as examples of a larger number of users and mobile phones. Many users of system 100 may have access to the Internet 10. For example, in the embodiment illustrated, user 23 has access to the Internet 10 through personal computer 13. Further, in this embodiment, mobile phone network 40 is in communication with the Internet 10, or information is capable of being communicated between mobile phone network 40 and the Internet 10.

In the embodiment illustrated, server 15 is in communication with the Internet 10. In this embodiment, server 15 is part of system 100, which provides an example of a system of managing personal information for a plurality of users (e.g., 21 to 23), each user having a mobile phone (e.g., 41 to 43) operating on a mobile phone network (e.g., 40). In this example, system 100 includes, on server 15, (at least one) first software module 61. Although shown just on server 15, in some embodiments, module 61 may be installed on or operating on more than one server. In certain embodiments, software module 61 may form at least one website 65. In this embodiment, at least a plurality of users (e.g., 21 to 23) may access or visit website 65 through the Internet 10 and elect to have their personal information managed through system 100 using their mobile phones (e.g., 41 to 43). For example, user 23 may access website 65 through computer 13 and internet 10. In different embodiments, computer 13 may be a desk top personal computer, a lap top or notebook computer, a PDA, etc. In some embodiments, users may access website 65 on server 15 through their phones (e.g., 41 to 43), through mobile phone network 40, or both.

In many embodiments, first software module 61 provides secure storage 64 for each user's (e.g., 21 to 23) personal information, for example, received from the user. In a number of embodiments, storage 64 may also be used to store personal information about the users that has been received by module 61 or server 15 from at least one third party, which may be acting on behalf of the user to provide information to the user, for example. In the embodiment illustrated, third party 33 may provide such information to module 61 through the Internet 10, and third party 31 may provide such information to module 61 through mobile telephone network 40 and the Internet 10. In some embodiments, information that is communicated through mobile telephone network 40 may also, or instead, be communicated through a traditional phone network, for example, that provides direct wired phone service for a number of users.

In the embodiment illustrated, third party 32 also provides information to module 61 on server 15 through a communication means other than the Internet 10. Such a communication means may be, for example, a private network, a local area network (LAN) a wide area network (WAN), a telephone network, a financial or bank card network, etc. Third parties 31, 32, and 33 are examples of data providers, or personal data provides. Third parties 31 to 33 may be, for example, financial institutions, airlines, bank card providers, merchants, an employer or employee of the user, news providers, health care providers, insurance companies, stock brokers, governmental agencies, non-governmental organizations, etc.

Website 65 may include a main or home page (or more than one such page) to which new users and new third parties may be directed. New users may be directed to this page or pages or to website 65 by search engines, advertisers, brokers, agents, or the like, as examples. Users (e.g., 21 to 23) may be assigned or asked to elect user names, user ID's, passwords, etc., which they may use to access secure areas or pages of website 65, for example, where their personal information may be entered, displayed, updated, etc. In some embodiments, security of such areas may be provided using novel systems and methods which will be described herein, for example. In some embodiments, these secure areas may include information entered by third parties (e.g., 31, 32, and 33). Further, in some embodiments, third parties (e.g., 31 to 33) may have their own secure areas (e.g., that are password protected, or protected as described herein) in which they may be able to enter, view, update, or a combination thereof, information for a number of users.

In the embodiment illustrated, the first software module 61 filters the personal information and selects nuggets of the personal information which the first software module 61 sends to the mobile phone (e.g., 41) of the appropriate user (e.g., 21). As used herein, a "nugget of information" is a discrete piece of information that is a subset of the total information. Nuggets of information may be in digital form, for example, and may be in text form, in the form of numbers or values, or a combination thereof, as examples. In some embodiments, nuggets may include pictures, text, graphics, or the like, as further examples. These nuggets may be sent, for example, through mobile phone network 40, for instance, and may be sent as text or short message service (SMS)

messages, for instance. In some embodiments, server 15 may access mobile phone network 40 through the Internet 10, for example.

In the embodiment illustrated, a second software module 72, is operating (e.g., independently) on at least a plurality of the mobile phones (e.g., 41 to 43, although module 72 is shown only on phone 41). Further, in this embodiment, the second software module 72 is configured to receive the nuggets of the personal information of the user (e.g., 21) from the first software module 61 through the Internet 10 and through mobile phone network 40, and to store the personal information on mobile phone 41 so that the personal information may later be accessed by user 21, for example, even when mobile phone 41 is not connected to mobile phone network 40. In the embodiment illustrated, user 21 may access the personal information, for instance, by viewing folder 76 containing nuggets 78 and 79, which may be organized by subject matter, for example. One such subject may be financial information, for example, which may include account balances, transaction records, etc., and another such subject, in some embodiments, may be travel information, as another example, which may include, for example, flight departure times and locations, etc. Other examples of subjects are described herein, and include insurance information, bank card information, medical records, appointments, and the like.

In some such embodiments, for at least a plurality of the users (e.g., 21 to 23), second software module 72 is downloadable by the users from first software module 61 to the mobile phones (e.g., 41 to 43), for example, through website 65, through the Internet 10, through mobile phone network 40, or a combination thereof. Further, in some embodiments, for at least a plurality of the users (e.g., 21 to 23), first software module 61 includes instructions to search at least a plurality of e-mails received for users (e.g., 21 to 23) for keywords, identifying numbers, or both, and to select the nuggets (e.g., 78 and 79) of the personal information from the e-mails using the keywords, identifying numbers, or both. For example, software module 61 may search e-mails received for a specific user (e.g., 21, 22, or 23) for account numbers, flight numbers, names of third parties, etc., and may extract nuggets of information pertaining thereto. In some embodiments, software module 61 may search all e-mails (e.g., sent to particular users), while in other embodiments, only e-mails from certain sources, or certain e-mail addresses may be searched.

In addition, in some such embodiments, for at least a plurality of the users, second software module 72 contains instructions to allow the user (e.g., 21) to select at least a portion of the personal information that is stored on the mobile phone (e.g., select nugget 78), select or enter an identifier of at least one of a different party (e.g., 22) and a different party mobile phone (e.g., 42), and elect to send the personal information (e.g., nugget 78) to the different party mobile phone (e.g., 42). Examples of such a different party are other users, for instance, for user 21, users 22 and 23 may be different parties, and their phones 42 and 43 may be different party mobile phones. Examples of such an identifier include the name of the different party, the phone number for the different party, a user identification number, etc. In many embodiments, for at least a plurality of the users, the first software module 61 further contains instructions to evaluate whether the different party mobile phone has certain functionality or contains a copy of particular software, such as second software module 72.

In some such embodiments, if the different party mobile phone contains a copy of the second software module 72, for example, then the first software module 61 may send the (at least a) portion of the personal information to the copy of the second software module 72 on the different party mobile phone, for instance, through mobile phone network 40, the Internet 10, or both. On the other hand, in some embodiments, if the different party mobile phone does not contain a copy of the second software module 72, for example, or in some cases other software having adequate equivalent functionality, then the first software module 61 may send the (at least a) portion of the personal information to the different party mobile phone, in another form, for instance, in the form of a standard e-mail or text message. In other embodiments, software module 72 may send the information directly to the different party rather than having the first software module (e.g., module 61) do it. In some embodiments, for at least a plurality of the users, the first software module 61 further contains instructions to receive a command from the user (e.g., from user 21), for instance, through mobile phone network 40, and upon the receipt of the command, to transmit at least a portion of the nuggets of the personal information to a different party (e.g., to user 22 or 23, or specifically, in some embodiments, to their phones 42 or 43), for example, through the Internet 10.

In addition, in some embodiments, for at least a plurality of the users, first software module 61 contains instructions to receive a command from the user, for instance, through mobile phone network 40, to dispute a financial transaction for a particular account described in the nuggets of the personal information. In particular embodiments, for example, upon the receipt of the command, first software module 61 may contain instructions to transmit a dispute of the transaction to a manager of the particular account through a network, such as Internet 10, for example. The manager of the account may be third party 33, for example, and may be a bank or financial institution, for instance. Such a dispute of the transaction may be transmitted to the third party (e.g., 33) in the form of an e-mail or a text message, for example, sent via the Internet 10, mobile phone network 40, or both, while in other embodiments, a dispute of a transaction may be sent through a private or financial network, as another example.

Further, in some embodiments, some or all of the mobile phones (e.g., 41 to 43) may be configured to transmit, receive, or both, local signals. For example, in the embodiment illustrated, mobile phone 42 includes local transmitter, receiver, antenna, or a combination thereof, local communication device 82, which, in this embodiment, communicates with reader or local communication device 88. In different embodiments, device 88 may read signals, send signals, or both. Communications devices 82 and 88 may exchange signals in one or both directions through near-field communications, a personal area network, Bluetooth, bar codes, WiFi, or the like, as examples.

Various embodiments of the invention provide for extracting particular information from a user's e-mails and sending that information to the user's mobile phone. Referring to FIG. 1, particular embodiments include, for example, various systems for managing information for at least a plurality of users (e.g., 21 to 23) using the Internet 10 and mobile phones (e.g., 41 to 43) of the users (e.g., 21 to 23). In many embodiments, the system includes a first software module 67 for sorting information. Such a software module 67 may be located on server 15, for example, and may be or be part of module 61, for instance, as shown. In some embodiments, first software module 67 includes programming instructions to receive a plurality of e-mails containing information about the business of the user (e.g., one of users 21 to 23). These e-mails may be all or a select portion of e-mails that have been sent to the particular user's (e.g., one of users 21 to 23) e-mail address, for example, via Internet 10.

The information about the business of the user may be, or include, as examples, personal information, financial information, travel information, information concerning financial accounts, financial transactions, expenditures, purchases, savings, loans, etc., or other information described herein or known in the art. Further, information about the business of the user may concern the user's personal affairs or the affairs of a business that is owned, controlled, managed, invested in, or an employer of the user, as additional examples. In some embodiments, fewer than all (i.e., select) e-mails sent to the particular user (e.g., one of users 21 to 23) may be received (e.g., at first software module 67). For example, in some embodiments, only e-mails sent from one or more particular senders or entities (e.g., from some or all of third parties 31 to 33) may be received (i.e., select e-mails), by module 67. Such senders (e.g., some or all of third parties 31 to 33) may include, for example, banks, financial institutions, card providers, airlines, travel agents, etc., or other examples of third parties 31 to 33 described herein, which may have been selected by the user (e.g., one of users 21 to 23) in certain embodiments.

In some embodiments, first software module 67 also includes programming instructions to search at least a plurality of the (e.g., select) e-mails for keywords or identifying numbers (or both), as examples, and extract particular information from the select e-mails. Examples of such keywords and identifying numbers include account numbers, frequent flyer numbers, flight numbers, words like "balance", "withdrawal", "debit", "delayed", "gate", "flight", "cancelled", or the like. Such particular information may include, for instance, account balances, amounts of withdrawals or debits from, or deposits to, accounts, amounts of bank card billings, travel information such as departure times, departure locations, status of flights, etc. In various embodiments, the first software module 67 also includes programming instructions to send the particular information to the user's (e.g., one of users 21 to 23) mobile phone (e.g., the appropriate one of phones 41 to 43) through, for instance, mobile phone network 40, the Internet 10, or both.

Various embodiments also include second software module 77 for running (e.g., that is running) on the user's mobile phone (e.g., the appropriate one of phones 41 to 43), which may include programming instructions to store (e.g., in storage 64 or folder 76) the particular information on the user's mobile phone (e.g., the appropriate one of phones 41 to 43), and provide access to the particular information by the user (e.g., one of users 21 to 23). Such a second software module 77 may be, for example, part of software module 72 shown in FIG. 1 on mobile phone 41. The particular information may be, include, or be included within, for example, the nuggets 78, 79, or both, for instance, as described herein.

Some such embodiments also include a third software module 17 configured for running on the user's computer (e.g., computer 13 of user 23), (or that is actually running on the user's computer) that includes programming instructions to search for e-mails from at least one particular sender (e.g., from one or more of third parties 31 to 33) and to send the e-mails from the at least one particular sender, for example, through the Internet 10, to first software module 67. In various embodiments, module 17 may forward e-mails to module 67, and in different embodiments, the e-mails may be kept as new, marked as read, or marked as forwarded on the user's computer (e.g., computer 13 of user 23), or may be deleted or erased therefrom. In certain embodiments, third software module 17 may be a plug-in for an e-mail management application, such as MICROSOFT OUTLOOK, for example.

Further, in some embodiments, first software module 67 includes programming instructions to encrypt the particular information before sending the particular information to the user's mobile phone (e.g., 41). In some embodiments, second software module 77 includes programming instructions to decrypt the particular information. Even further, in some embodiments, first software module 67 includes programming instructions to compress the particular information before sending the particular information to the user's mobile phone (e.g., 41). And in some embodiments, second software module 77 includes programming instructions to decompress the particular information. Decryption and compression may be used together or separately in different embodiments.

Additionally, in certain embodiments, first software module 67 includes programming instructions to receive instructions from the user (e.g., user 21) identifying at least one threshold for alarm for at least a portion of the particular information. In particular such embodiments, first software module 67 or second software module 77 (or both) includes programming instructions to compare at least a portion of the particular information to the threshold. Furthermore, in some embodiments, first software module 67 or second software module 77 (or both) includes programming instructions to provide an alarm to the user if the particular information passes the threshold. Such an alarm may be, for example, in a manner described herein, such as an audible alarm a light or display, a vibratory alarm, or a combination thereof.

In some embodiments, for example, for one or each of multiple users (e.g., users 21 to 23), the particular information includes financial account information, which may include, for instance, amounts of withdrawals or debits from an account, such as a financial or bank account. In certain embodiments, the (e.g., at least one) threshold may be, or include, the amount of a withdrawal or debit, for example, and first software module 67 or second software module 77 (or both) may include programming instructions to provide an alarm to the user [e.g., the appropriate one (or more) of users 21 to 23] if a withdrawal or a debit (or both) exceeds the threshold. In another example, in some embodiments, for each of a plurality of the users (e.g., users 21 to 23), the particular information includes travel information, which includes a departure time, a departure location (e.g., a departure gate), or both. In some such embodiments, first software module 67 or second software module 77 (or both) includes programming instructions to provide an alarm if there is a change in the departure time or the departure location (or both), as examples. In other embodiments, alarms may be provided for other thresholds or other criteria.

Further, in a number of embodiments, for one or more of the users (e.g., users 21 to 23), second software module 77 contains programming instructions to allow the user (e.g., user 21) to select at least a portion of the particular information that is stored on the mobile phone (e.g., 41), select or enter a third party mobile phone number (e.g., the phone number of user 22), and elect to send at least a portion of the particular information to the third party mobile phone (e.g., to mobile phone 42 of user 22). In some embodiments, for at least a plurality of the users (e.g., user 21), first software module 67 further contains instructions to evaluate whether the third party mobile phone (e.g., mobile phone 42 of user 22) contains a copy of second software module 77, module 72, or both. In some such embodiments, if the third party mobile phone (e.g., mobile phone 42 of user 22). contains a copy of second software module 77, for example, then first software module 67 may send the portion of the personal information to the copy of second software module 77 on the third party mobile phone (e.g., mobile phone 42 of user 22) for example, through mobile phone network 40, the Internet, or both.

Figure 2:
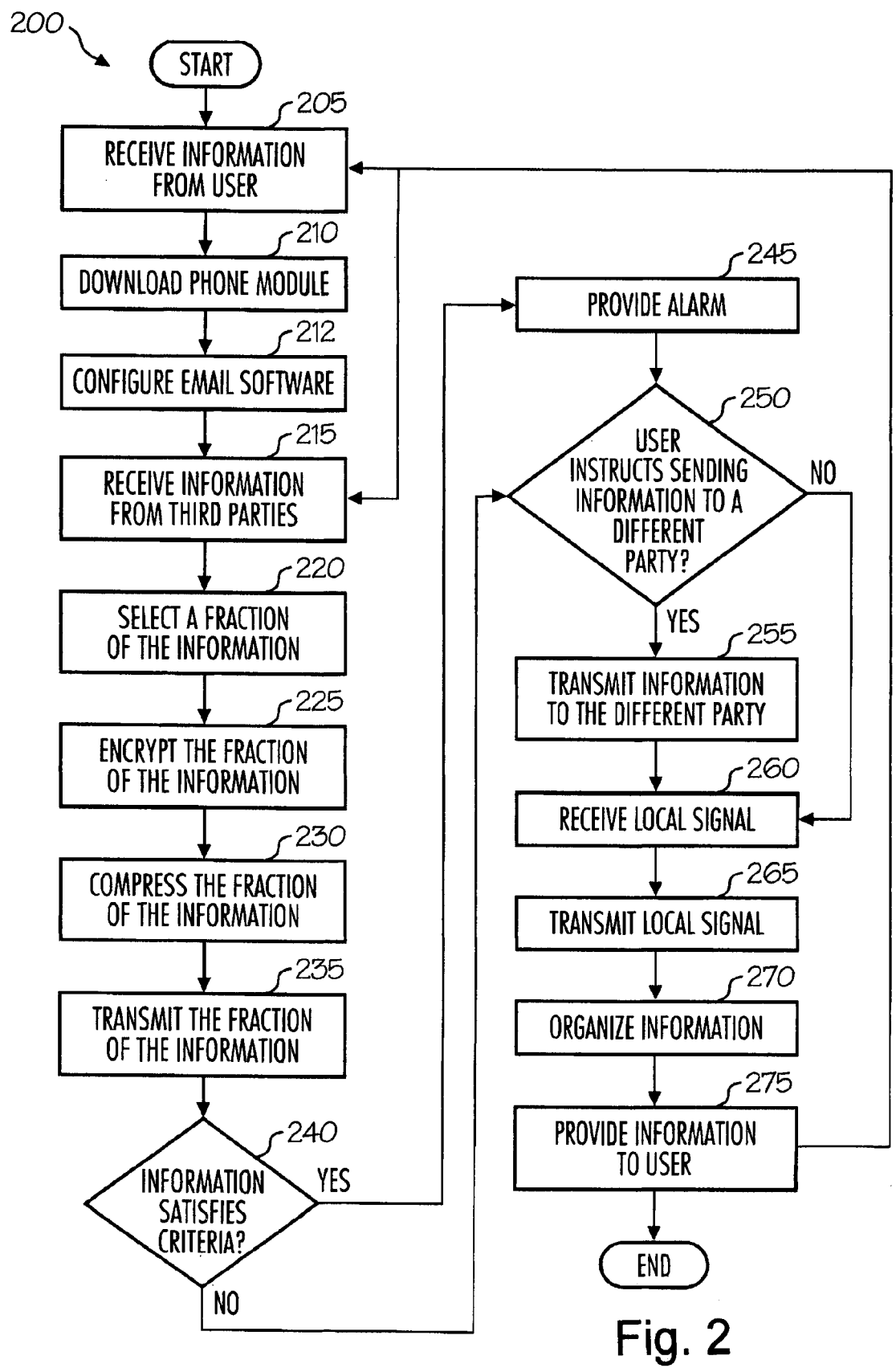
FIG. 2 is a flowchart illustrating examples of various methods, including, for instance, methods of managing information for at least a plurality of users using the Internet and mobile phones of the users.
Figure 3:
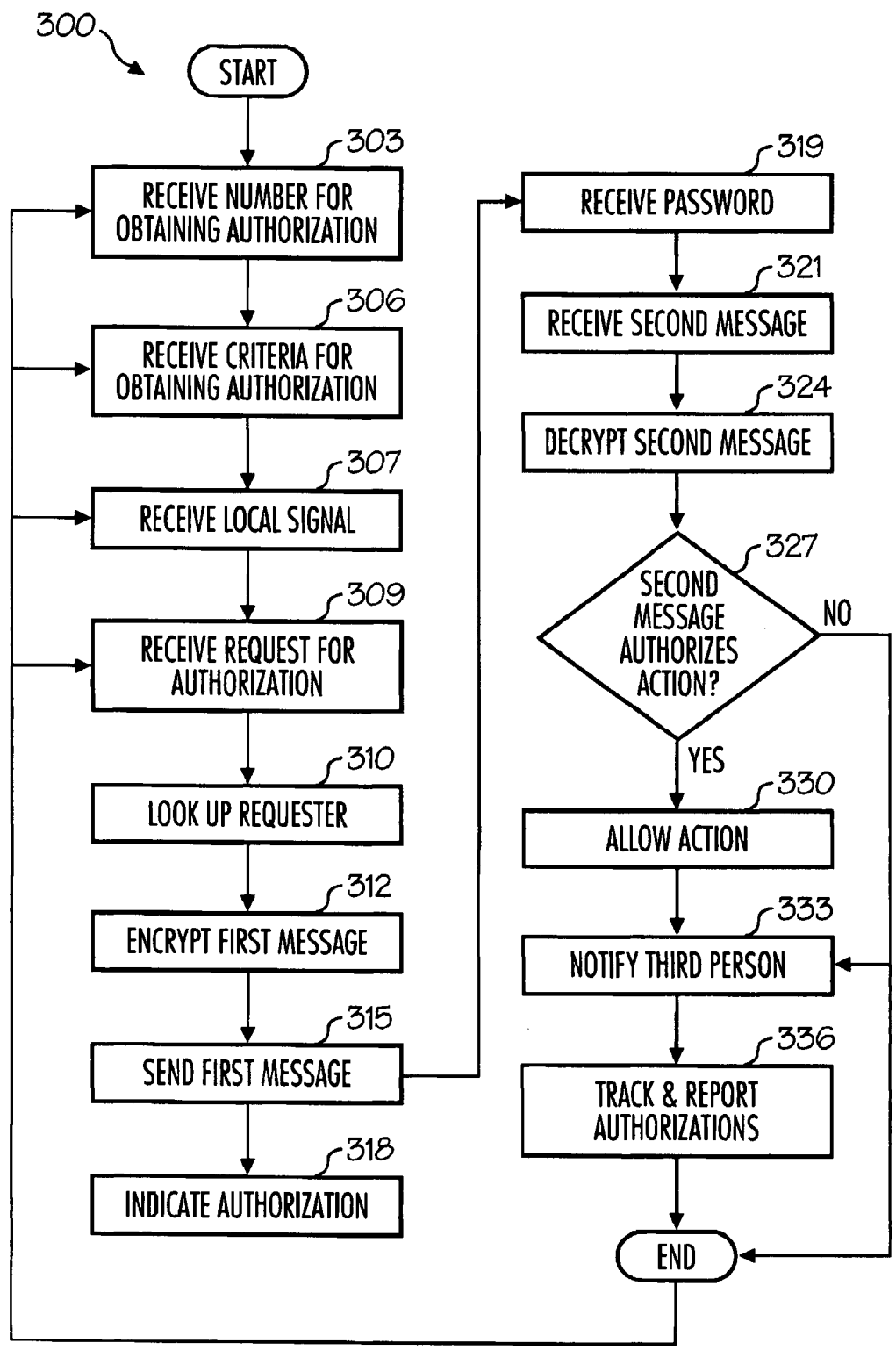
FIG. 3 is a flowchart illustrating examples of various methods, including, for instance, methods of authorizing actions, methods of authenticating transactions, and methods of authenticating access, in many embodiments, using mobile phones.
Figure 4:
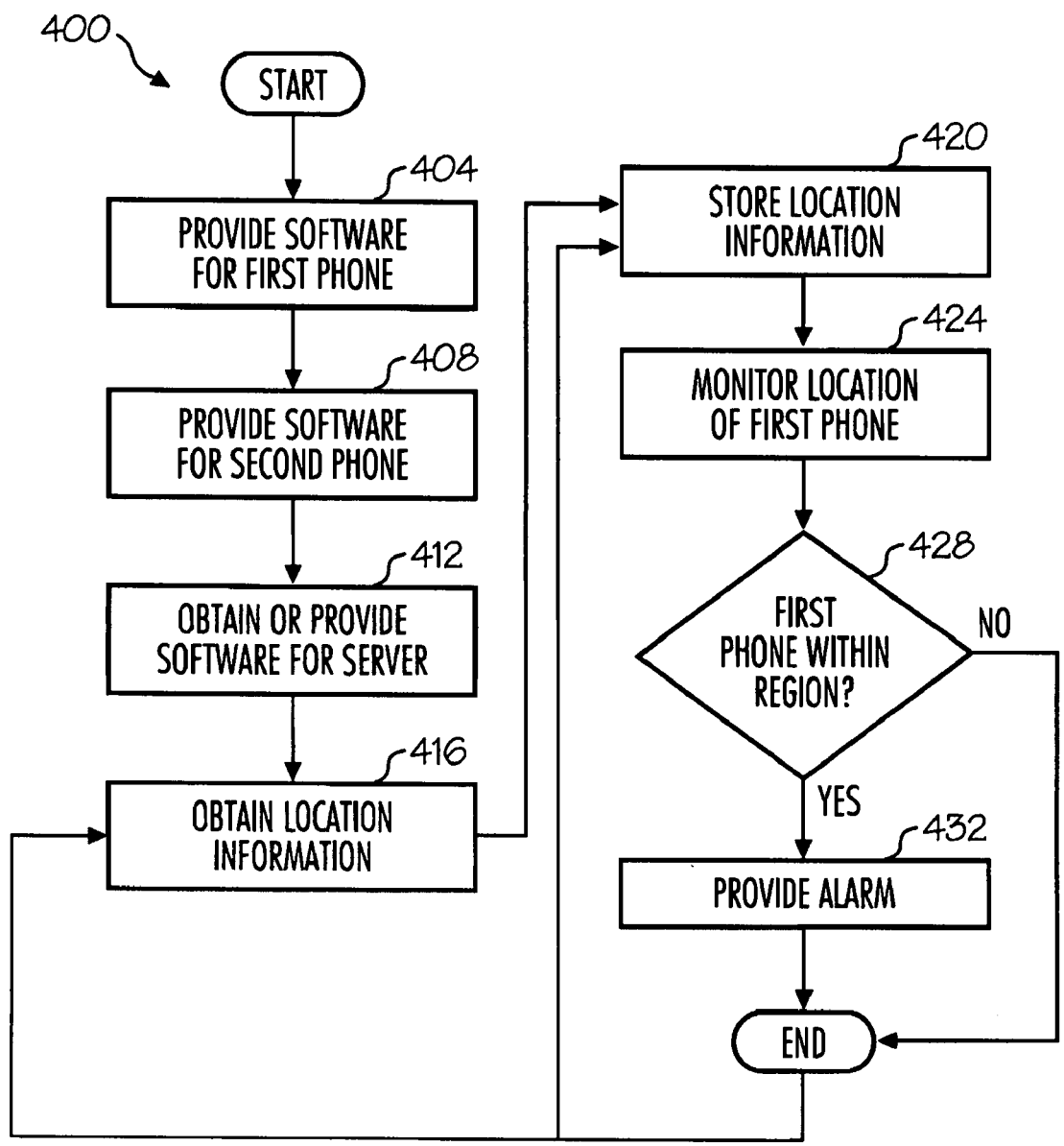
FIG. 4 is a flowchart illustrating examples of various methods, including, for instance, methods of providing positional awareness, in many embodiments, using mobile phones.

The invention also provides various methods, including, for example, methods of managing information for a number of users, methods of authorizing actions, methods of authenticating transactions, methods of authenticating access, and methods of alarming as to proximity to a location. FIGS. 2 to 4 illustrate examples of such methods, and different methods in accordance with the invention may include a selection of the operations or acts shown in FIGS. 2 to 4, described herein, or both, which may be performed or accomplished in the order presented, or in many embodiments, in a different order.

Turning now to FIG. 2, this figure is a flowchart illustrating examples of various methods, including, for instance, methods of managing information for a number of users using the Internet and mobile phones of the users. Many embodiments of the invention have some but not all of the acts shown in FIG. 2. In the particular embodiment illustrated, method 200 includes receiving information from a user (act 205). This may include, in some embodiments, at least for each of a plurality of the users, receiving a first set of personal information (e.g., of the user) from the user through at least one of the Internet and the mobile phone of the user.

For example, user 23 shown in FIG. 1 may go to or access website 65 through computer 13 and the Internet 10, may open an account, and may enter information, select options, etc. Information that may be entered or selected may include, for example, names of financial institutions, account numbers, names of airlines, frequent flyer numbers, names of insurance companies, insurance policy numbers, driver's license numbers, passport information, etc. In some cases, this personal information may be complete, while in other cases, the first set of personal information may include information to facilitate receipt or completion of information from one or more third parties (e.g., 31 to 33), such as by identifying the third parties, accounts, etc.

Further, in some embodiments, the first set of personal information includes identification of information that is important to the user, which may include a criteria for alarming. Such a criteria (e.g., received in act 205) may be entered by the user or selected from one or more menus, for example. The criteria may include, for instance, an election to receive an alarm if a withdrawal, debit, or charge from a financial account exceeds a threshold that is entered or selected by the user. In some embodiments, the criteria (e.g., received in act 205) may include a selection or indication of whether the user is to receive alarms throughout the day, or only during certain hours of the day, as another example, which may vary depending upon the nature of the alarm or the particular threshold. Other examples of alarms include whether travel departure times, departure locations, or the like, have changed, whether bills are due, whether insurance coverage has expired, whether stock prices have changed, whether weather conditions or forecasts, or other environmental conditions meet a certain criteria, whether a document or credential is about to expire, whether someone has requested a particular action or access, whether children have traveled into a region of concern, etc.

In certain embodiments, method 200 further includes downloading a mobile phone module (act 210). In some embodiments, for example, for at least a plurality of users, the user instructs the server (e.g., 15) or selects at a website (e.g., 65) to download a mobile phone module, for example, second software module 72 shown in FIG. 1. In a particular embodiment, for instance, second software module 72 is downloaded from first software module 61 through the Internet 10 and mobile phone network 40 to mobile phone 41, upon instruction by user 21. In other embodiments, software module 72 may be downloaded to mobile phone 43, for example, through the Internet 10, and computer 13, for instance, through a USB port or a wireless network. In other embodiments, software module 72 may be loaded onto the phone at a store where the mobile phone was purchased, or at an establishment of the entity that controls server 15, that operates website 65, or that provides a service or system of managing information for a number of users.

In a number of embodiments of the invention, and in the particular embodiment shown in FIG. 2, method 200 includes receiving information from third parties (act 215). In some embodiments, for example, for each of a plurality of the users, this act (215) includes receiving a second set of personal information of each user from at least one third party, for instance, through a network (e.g., the Internet 10). In many embodiments, this act (215) may be performed or accomplished, for a particular user, after receiving personal information (act 205) from that particular user, which may identify the third party, provide information with which the third party can identify the particular user, identify particular information that the particular user authorizes or requests be provided from the third party, identify bank accounts, etc.

In many embodiments, the user may directly request a third party to send the information. For example the user may visit a third party website (e.g., via the Internet 10), login to the third party website and provide information to the third party through the website to identify the user in system 100 (FIG. 1), which would also indicate the user's willingness for the third party to send the information. In various embodiments, the information received from the third parties (e.g., in act 215) may include one or more account balances, one or more descriptions of account transactions (e.g., an amount of a withdrawal, which may include, who the withdrawal is to), flight information, changes in flight information, insurance information, loyalty information, passwords, pass codes, calendar entries, navigational information, account numbers, bank card numbers, location information concerning regions of concern, etc.

In the embodiment illustrated, method 200 further includes selecting a fraction of the information (act 220). In some embodiments, for example, a fraction of the information received from the third parties (e.g., in act 215) may be selected, for example, by the first software module 61. As used herein, "selecting a fraction" of certain information means selecting less than all of that information. For example, particular subsets or nuggets of the information may be selected. In some embodiments, the fraction of the information may be selected (e.g., in act 220) using a criteria that has been predefined (e.g., in module 61). In some embodiments, the fraction of the information may be selected (e.g., in act 220) using the criteria (e.g., received in act 205).

In various embodiments, in act 220, particular information is selected that is considered to be of particular importance or concern to the user. Examples include changes in departure time, status, or departure location for a flight that the user is booked on, withdrawals from an account that exceed a threshold, account balances, etc. In particular embodiments, for each of a plurality of the users, for instance, act 220 may include selecting a fraction of the second set of personal information described herein, while in various embodiments, act 220 may include selecting a fraction of the first set of personal information instead, or in addition.

Various embodiments of the invention include encrypting the fraction of the information (act 225). The information that is encrypted may be the fraction of the information that is selected in act 220, for example. In some embodiments, a fraction of the second set of personal information in encrypted (e.g., in act 225), for example. Information may be encrypted (e.g., in act 225), for example, to maintain its confidentiality. Information may be encrypted (e.g., in act 225), for example, using PGP (pretty good privacy), public-key cryptography, asymmetric key encryption, or the like, as examples.

Further, Various embodiments of the invention include compressing the fraction of the information (act 230). The information that is compressed may be the fraction of the information that is selected in act 220, for example. In some embodiments, a fraction of the second set of personal information in compressed (e.g., in act 230), for instance. Information may be compressed (e.g., in act 230), for example, to make it easier, quicker, or less expensive to transmit, store, or both.

In different embodiments, information may be compressed (e.g., in act 230), encrypted (e.g., in act 225), or both, in either order. In some embodiments, method 200 further includes, for each of a plurality of the users, before the transmitting of the fraction of the second set of personal information (e.g., act 235), for example, to the user's mobile phone, at least one of encrypting (e.g., act 225) the fraction of the second set of personal information (e.g., selected in act 220), and compressing (act 230) the fraction of the second set of personal information (e.g., selected in act 220). In certain embodiments, the encrypting (e.g., act 225), and the compressing (act 230), for example, of the fraction of the second set of personal information (e.g., selected in act 220), may be repeated, for instance, along with other acts, as described herein.

In the embodiment illustrated, method 200 also includes, as mentioned, transmitting information (act 235). Such information may include, for example, the fraction of the second set of personal information (e.g., selected in act 220). In various embodiments, the receiving (act 205), for example, of the first set of personal information, the receiving (act 215), for example, of the second set of personal information, the selecting of the fraction (act 220), and the transmitting of the fraction (act 235), are all performed by the first software module 61 residing on server 15 connected to the Internet 10. And in some embodiments, the first software module 61 further forms the (at least one) Internet website 65. In some embodiments, methods include, for example, for each of a plurality of the users, transmitting the fraction (e.g., selected in act 220) of the second set of personal information to the user's mobile phone, for example, through the mobile phone network (e.g., network 40 shown in FIG. 1) for storage on the user's mobile phone, for instance, using second software module 72 (e.g., residing on the phone).

In this embodiment, method 200 further includes evaluating whether information satisfies a criteria (act 240). Such a criteria may be, as described herein, or provided or selected by the user (e.g., in act 205). If the information (e.g., the fraction of the information selected in act 220, transmitted in act 235, or both) satisfies the criteria (e.g., for alarming, for instance, as determined in act 240), then an alarm may be provided (act 245). In some embodiments, the method includes, for each of a plurality of the users, for example, using the second software module, providing an alarm to the user (act 245) if at least a portion of the fraction of the second set of personal information satisfies the criteria. Such an alarm (e.g., of act 245) may be audible, visual, or, for example, in the form of a vibration. In some embodiments, a sound or vibration may be produced by the mobile phone of the user (e.g., in act 245), and the reason for the alarm may be displayed on the screen of the phone, for instance. In some embodiments, the default ring tone of the phone or an existing phone ring setting may be used for the alarm (e.g., in act 245), as examples.

In some embodiments, the user may be prompted to acknowledge the alarm or the description of the reason for the alarm, or may be asked to make a response or take an affirmative action to provide consent, for example, for the reason for the alarm or an event described in the description. For example, if the reason for the alarm is that a withdrawal has been made from the user's bank account, the mobile phone may ring or vibrate. The user may then open the phone or press a button on the phone to acknowledge the alarm. The phone may then display the amount of the withdrawal, for example, along with a description of the account, and of the transaction. In some embodiments, the user may be asked to make a selection to provide consent to the withdrawal, for instance. In another scenario, the phone may ring to provide an alarm that the user's flight has been delayed, as another example. The user may open the phone to acknowledge the alarm, and a brief description of the delay, and new estimated departure time, may be provided on the screen of the mobile phone, for instance. Other examples are described herein.

In some such methods, for example, for each of a plurality of the users, the first set of personal information (e.g., received in act 205) includes an identification of at least one financial account, the second set of personal information (e.g., received in act 215) includes an identification of deposits into the account, withdrawals from the account, and a balance of the account, and, the providing of an alarm (act 245) includes at least one of alarming if a withdrawal exceeds a first threshold identified within the criteria, and alarming if the balance of the account drops below a second threshold identified within the criteria. As used herein, such a "withdrawal" may be a debit from or a charge to the account, as examples.

As another example, in some methods, for each of a plurality of the users, the first set of personal information (e.g., received in act 205) includes at least one of travel information (e.g., frequent flyer information such as a frequent flyer identification number) and an identification of at least one of a common carrier and a travel agent. Further, in some embodiments, the second set of personal information (e.g., received in act 215) includes travel itinerary, which may include identification of a departure time and a departure location, for example. And the providing of an alarm (act 245) may include alarming if there is a change in at least one of the departure time and the departure location, in some embodiments. In many embodiments, if the information (e.g., the fraction of the information selected in act 220, transmitted in act 235, or both) does not satisfy the criteria (e.g., for alarming, for instance, as determined in act 240), then an alarm may not be provided, and act 245 may be skipped, at least for that particular iteration of method 200.

In various embodiments, method 200 further includes transmitting information to a different party (act 255). In many such embodiments, the user may (e.g., first) select, or otherwise provide instructions or commands to send certain information to the third party (evaluated in act 250). In particular, in some embodiments, (e.g., in the order indicated or in another order), for at least a plurality of the users, method 200 may include, upon instruction by the user (e.g., evaluated in act 250), transmitting (e.g., in act 255) at least a portion of the second set of personal information (e.g., received in act 215, selected in act 220, transmitted in act 235, or a combination thereof) to a different party mobile phone. In some embodiments, this may be accomplished through the mobile phone network (e.g., 40) for storage on the different party mobile phone, for instance, for access by the different party.

Referring to FIG. 1 for an example, user 21 may provide an instruction or command (e.g., in act 250), for instance, through user 21's mobile phone 41, to send at least a portion of the information received (e.g., in act 235), to different user 22, specifically, via mobile phone 42. In different embodiments, mobile phone 41 may send the portion of the information to mobile phone 42, for example, through mobile phone network 40, or mobile phone 41 may instruct server 15 or first software module 61 to send the portion of the information to mobile phone 42, for instance, through the Internet 10, mobile phone network 40, or both, as examples. In some embodiments, delivery may be certified, or delivery may be tracked and the sender may be notified when delivery has been accomplished, or alternatively, when delivery has been unsuccessful.

In some embodiments, the first software module 61 receives a command (e.g., in act 250) from the user (e.g., 21), for instance, through mobile phone network 40, and upon the receipt of the command (e.g., in act 250), transmits (e.g., in act 255) at least a portion of the nuggets (e.g., 78) or fraction of the personal information to the different party (e.g., 22) through the Internet 10. In some embodiments, the system (e.g., system 100) may send the particular information, fraction thereof, or nuggets in different ways (e.g., in act 255), depending on whether the different party is a user of system 100 [e.g., has visited website 65 and elected to have their personal information managed by system 100, or has downloaded (e.g., act 210) or otherwise received, or has installed, the second software module 72 on their mobile phone].

In some embodiments, the user (e.g., 21) may select (e.g., in act 250) at least a portion of the personal information that is stored on the mobile phone (e.g., 41), select or enter (e.g., in act 250) an identifier of at least one of a different party (e.g., 22) and a different party mobile phone (e.g., 42), and elect (e.g., in act 250) to send (e.g., in act 255) the at least a portion of the personal information to the different party mobile phone (e.g., 42). In many embodiments, the first software module 61 evaluates whether the different party mobile phone (e.g., 42) contains a copy of the second software module 72, and if the different party mobile phone (e.g., 42) contains a copy of the second software module 72, then the first software module 61 sends (e.g., in act 255) the portion of the personal information to the copy of the second software module 72 on the different party mobile phone (e.g., 42), for example, through the mobile phone network 40 (e.g., by SMS). In some embodiments, delivery may be certified, or a notification message may be sent (e.g., by SMS to user 21) when delivery has been accomplished, or alternatively, after a certain amount of time or number of attempts when delivery has been unsuccessful.

In particular embodiments, for example, the portion of the second set of personal information (e.g., transmitted in act 255) includes a travel itinerary, for instance. Thus, a user is able to conveniently send their travel itinerary to another person. In FIG. 2, in many embodiments, if the user does not instruct particular information to be sent to a different party, then the act of transmitting information to a different party (act 255) is omitted, at least for that iteration of method 200.

Still referring to FIG. 2, in many embodiments of the invention, and in the embodiment illustrated, method 200 further includes receiving a local signal (act 260), transmitting a local signal (act 265) or both. As used herein, a local signal is a signal that is transmitted and received without going through the main transmitter that the mobile phone uses for placing telephone calls and without going through the main receiver that the mobile phone uses for receiving telephone calls. Similarly, a local signal does not go through the mobile phone network (e.g., 40). For example, a local signal from mobile phone 42 may be transmitted by local transmitter or communications device 82 and received (i.e., directly) by reader or communications device 88, or vice versa. Examples of local signals include near field communication (NFC) signals and Bluetooth communication signals, for example, that use transmitters, receivers, or both (e.g., device 82), on the mobile phone that are separate from the transmitter and receiver that are used for telephone conversations.

In particular embodiments, method 200 further includes, for each of a plurality of the users, using signal receiving hardware (e.g., device 82 shown in FIG. 1) located on the user's mobile phone (e.g., 42), and using the second software module (e.g., 72), under the control of the user (e.g., user 22), receiving (e.g., in act 260) a local signal from a transmitter (e.g., device 88) within proximity to the mobile phone (e.g., 42). Further, some embodiments of the invention include, for example, for each of a plurality of the users, using local signal transmitting hardware (e.g., device 82) located on the user's mobile phone (e.g., 42), and using the second software module (e.g., 72), under the control of the user (e.g., 22), transmitting a local signal (e.g., in act 265) that includes at least a portion of at least one of the first set of personal information (e.g., received in act 205) and the second set of personal information (e.g., received in act 215) to a reader (e.g., device 88) within proximity to the mobile phone (e.g., 42). As used herein, "proximity", in this context, means within ten (10) feet, and "close proximity" means within one (1) foot.

In particular embodiments, for example, for each of a plurality of the users, the first set of personal information (e.g., received in act 205) includes at least one of loyalty information and identification of at least one of a merchant and a service provider, and at least one of the first set of personal information (e.g., received in act 205) and the second set of personal information (e.g., received in act 215) includes the loyalty information. Further in some such embodiments, the local signal (e.g., transmitted in act 265) includes at least a portion of the loyalty information, and the transmitting of the local signal (e.g., act 265) includes transmitting the at least a portion of the loyalty information to at least one of the merchant and the service provider. Such a merchant and service provider are examples of the third parties 31 to 33 shown in FIG. 1, for example. Thus, a user (e.g., 22) may be able to use their mobile phone (e.g., 42) to store and provide loyalty information, for example, a COSTCO membership, membership to a health club, a SAFEWAY card, etc. In some embodiments, insurance information may be handled in such a manner, or similarly.

Local signals (e.g., between devices 82 and 88) may also (or instead) be used to make purchases or payments. In certain embodiments, as an example, for each of a plurality of the users, the first set of personal information (e.g., received in act 205) includes at least one of bank card information and an identification of at least one of a bank and a bank card provider. Such a bank or a bank card provider may be further examples of the third parties 31 to 33 shown in FIG. 1, for instance. In some embodiments, at least one of the first set of personal information (e.g., received in act 205) and the second set of personal information (e.g., received in act 215) includes the bank card information, the local signal (e.g., transmitted in act 265) includes the bank card information, and the transmitting of the local signal (e.g., in act 265) includes transmitting the bank card information to at least one of the merchant and the service provider to make or authorize a payment, as examples. As used herein, the phrase "bank card" includes, for example, credit cards and debit cards, whether or not issued by a bank.

In some embodiments, for instance, using near field communications, a user (e.g., 22) can swipe his or her phone (e.g., 42, or specifically, device 82) past an NFC reader (e.g., device 88) to communicate the user's bank card number or information for payment for goods or services, thus eliminating the need to carry or present the bank card.

In the embodiment illustrated, method 200 further includes organizing certain information (act 270), for example, information that is handled by system 100. For example, in many embodiments of the invention, the second software module 72 organizes (act 270), at the mobile phone (e.g., 41), the fraction (e.g., nuggets 78, 79, or both) of the second set of personal information (e.g., selected in act 220 and transmitted in act 235), which may include, in various embodiments, where applicable, decrypting the information, decompressing the information, making the fraction of the second set of personal information accessible to the user (act 275), for instance, on the user's mobile phone, or a combination thereof. In some embodiments, for each of a plurality of the users, the second software module (e.g., 72) organizes (act 270) the fraction of the second set of personal information based on topic and makes the fraction of the second set of personal information (e.g., nuggets 78, 79, or both) accessible (act 275) to the user (e.g., 21), for instance, based on the topic of the information (e.g., in folder or folders 76).

In various embodiments of the invention, some or all of the acts of method 200 may be repeated. For example, in some embodiments (e.g., for each of a plurality of the users) method 200 may involve repeating, at least a plurality of times, the receiving (act 215), for example, of the second set of personal information, the selecting of the fraction (act 220), and the transmitting of the fraction act 235). In many embodiments, where applicable, the encrypting (act 225), compressing (act 230), providing of an alarm (act 245), transmitting of information to a different party (act 255), receiving or transmitting (or both) of local signals (acts 260, 265, or both), the organizing of the information (act 270), the providing of the information to the user (act 275) or a combination thereof, may be repeated, as appropriate. Further, in some embodiments, the receiving of information from the user (act 205) may be repeated, but may be repeated less often than certain other acts, such as the receiving of information from third parties (act 215), for instance.

In many embodiments (e.g., for each of a plurality of the users), the repeating includes (e.g., as part of act 270) replacing at least a portion of the fraction of the second set of personal information that is stored on the user's mobile phone, while maintaining the organization of the information, for instance, based on the topic of the information. Further, in various embodiments, for each of a plurality of the users, the repeating includes (e.g., as part of act 270) synchronizing at least a portion of the fraction of the second set of personal information that is stored on the user's mobile phone with corresponding personal information that was already stored on the mobile phone, while maintaining the organization of the information based on the topic of the information. As used herein, "synchronizing" of information includes both replacing and appending the information, while sorting or maintaining a sorted organizational structure based on topic. Topics may include, for example, travel information, account information (which may be sorted for different accounts), bank card information, loyalty information, insurance information, etc.

In various embodiments, a user (e.g., 22) may be able to use a mobile phone (e.g., 42) to gain access to a physical space, such as an elevator, floor or area of a building, parking garage, etc. Access may be obtained, in some embodiments, for example, by passing the phone (e.g., 42) by or over a reader (e.g., communications device 88), transmitting a local signal (e.g., in act 265), for example, using near field communication (NFC). In some embodiments, for instance, user 22 selects the desired code or number on phone 42, and then rubs phone 42 against the reader or device 88 or passes phone 42 over or by device 88. In certain embodiments, user 22 may provide or select the code by name, for example, "elevator", which may be selected from a menu on mobile phone 42 or input as a voice command, for instance.

In some embodiments, phone 42 may then transmit (e.g., in act 265) a local signal containing a code that the reader (e.g., device 88) will understand, for example, to identify user 22. In such embodiments, phone 42 may have local transmitter or communications device 82, which may be an NFC antenna, for example. In some embodiments, an NFC antenna (e.g., local transmitter or device 82) may be retrofitted onto a pre-existing phone 42 by replacing a back or battery cover of the phone with a cover having an antenna, circuitry, or both. In other embodiments, an NFC antenna (e.g., local transmitter or device 82) may be an original equipment component of phone 42, for example.

Some embodiments may use (e.g., for local transmitter or communications device 82) Bluetooth communication for particular functions in addition to or instead of NFC. For example, Bluetooth may be used for access to parking areas, and a user carrying a phone may be given access in some embodiments without a need to open the car window. Other embodiments may use WiFi or other forms of communication such as infrared, bar codes, or the like. And in some embodiments, transponders may be used. In addition to providing access, such use of mobile phones and local signals may be used to track who has accessed particular areas, track movement of employees or other people, verify that employees are working quickly enough, verify that employees or others are traveling at safe speeds, track work or break times, etc., which may be published in one or more reports.

In some embodiments, a user (e.g., 22) may make selections, identify desired actions, provide assent, or perform other affirmative acts, by passing the phone (e.g., 42) by a reader (e.g., device 88) or a combination of several readers. For example, a user in a store may obtain information on a particular product by passing the user's phone by a particular reader (e.g., device 88). Or, in some embodiments, a user may identify potential gifts for a bridal registry or identify a large item to be picked up at the register, as other examples. Further, in particular embodiments, a user may be able to subscribe, in such a manner, to particular advertisements, for example, for a particular type of product or from a particular source. Further, phone 42 may be able to be used in a similar manner, in some embodiments, by passing phone 42 past reader or device 88, to show membership (e.g., to COSTCO or to a gym or country club) to obtain frequent flyer miles, to get discounts that are provided to holders of loyalty cards, or the like. In other embodiments, a user may make affirmative acts in other ways, for example, responding to questions displayed on a phone by pressing one or more buttons, for example, on the phone.

In some embodiments, a phone may provide identification of the user. For example, phone 42 may contain and provide user 22's driver's license number, social security number, credit card number, account number, address, phone number, employee ID number, birth certificate, proof of citizenship, proof of legal residency, security clearance, passport number, visa number, criminal record, credentials, badge number, or the like, for example, through transmitter or local communications device 82. For example, in particular embodiments, in an airport, the phone may indicate a higher level of security which may permit the user to bypass of some or all of security. In addition, in certain embodiments, if a phone is lost or stolen, the authorized user may be able to wipe the phone of personal information, locate the phone, disable the phone, or a combination thereof, for example, with another phone or through website 65, for example. Such an action may be accomplished by sending instructions to the phone (e.g., through mobile phone network 40), and in the case of locating the phone, instructing the phone to provide its GPS coordinates, other location information, or both. In some embodiments, this may require entering at least one code or password, for instance. Further, it may be possible, in some embodiments, to reload the information back onto the phone, or onto a new or other phone, from an archive, for instance, at website 65.

In some embodiments, the mobile phone (e.g., software module 72 on phone 41) may lock the user (e.g., 21, or another user who might not be authorized) from accessing information if the software (e.g., 72) or the phone (e.g., 41) has not been used for a specified period of time, or if the user has repeatedly failed to provide the correct password for the software (e.g., 72). In other embodiments, the software (e.g., software module 72 on phone 41) may provide the GPS coordinates of the phone (e.g., to module 61 on server 15) at regular intervals, upon accessing or exiting the software (e.g., 72), upon accessing the phone (e.g., 41), upon turning the phone off, upon turning the phone (e.g., 41) on, upon running out of battery, or a combination thereof, as examples.

In a number of embodiments, a mobile phone may contain insurance information, as an example of a topic of personal information, which may include, for example, proof of insurance (e.g., automobile or health insurance), coverage, payment dates, preferred providers, and the like. In some embodiments, the user (e.g., 21 to 23) may be reminded (e.g., provided an alarm in act 245) to make payments, obtain expanded coverage, make or keep an appointment, or the like, via the phone (e.g., 41 to 43). For instance, in some embodiments, a user may be prompted (e.g., provided an alarm in act 245) through the phone to authorize payment, for example, for insurance, utilities, mortgage or house payments, rent, credit card payments, various bills, etc. In another example, a user may be reminded (e.g., provided an alarm in act 245) to obtain automobile insurance for another country when traveling into or near that country, and in some embodiments, it may be possible to purchase such insurance over the phone, obtain proof of insurance on the phone, or both, as examples.

As described herein, specific embodiments include, among other things, ways to communicate information to other electronic devices, and, in certain embodiments, ways to affirmatively make selections. In some embodiments, the electronic device or reader (e.g., device 88) may query the phone (e.g., 42) for the particular information that is needed, a handshake routine may be followed, or both. In some embodiments, an affirmative act of assent may be required, at least for certain functions, for example, to authorize a transaction or payment, or to authorize access. Such an act of assent may include, for example, user 22 entering a personal identification number (PIN) or a password into a graphical user interface or keyboard on the mobile phone, providing a signature on a touch pad, providing a biometric, passing the phone (e.g., 42) by an NFC reader (e.g., device 88), or the like.

Further, in some of these embodiments, for yet another example, the first software module (e.g., module 61) includes programming instructions to receive (e.g., in act 205) instructions from the user identifying at least one threshold for alarm (e.g., used in act 240) for at least a portion of the particular information (e.g., nugget 78). In some of these embodiments, at least one of the first software module (e.g., 61) and the second software module (e.g., 72) includes programming instructions to compare (e.g., in act 240) at least a portion of the particular information to the threshold. And in some such embodiments, at least one of the first software module (e.g., 61) and the second software module (e.g., 72) includes programming instructions to provide an alarm (e.g., in act 245) to the user if the particular information passes the threshold (e.g., in act 240).

As mentioned, in some embodiments, certain methods of managing information for users using the Internet and mobile phones involve extracting information from e-mails and sending the information to the mobile phones. Particular such methods include (e.g., as or within act 215), an act of receiving e-mails, for instance, from third parties. For example, in some embodiments, for each of a plurality of the users (e.g., users 21 to 23), method 200 includes an act of receiving at an information sorting software module (e.g., 67), a plurality of (e.g., select) e-mails containing information about the business of the user, wherein the user has caused the select e-mails to be sent to the information sorting software module (e.g., act 215). Such examples of method 200 may also include, for example, for each of a plurality of the users, using the information sorting software module (e.g., 67), an act of searching at least a plurality of the select e-mails for at least one of keywords and identifying numbers, and also for each of a plurality of the users, using the information sorting software module (e.g., 67), an act of extracting the particular information from the select e-mails (e.g., act 220). As used herein, this act of extracting particular information does not mean or include forwarding or sending (e.g., in act 235) the whole e-mail. Rather, a portion (i.e., less than all) of the information within the e-mail is extracted (e.g., in act 220) to be sent (e.g., in act 235).

In a number of embodiments, such examples of method 200 also include, for each of a plurality of the users (e.g., users 21 to 23 shown in FIG. 1), sending (e.g., in act 235) the particular information to the user's mobile phone (e.g., phone 41 of user 21) through a mobile phone network (e.g., 40) for storage on the user's mobile phone (e.g., 41) and access by the user (e.g., 21). In some embodiments, the particular information that is sent may be, contain, or be similar to, the nuggets (e.g., 78 and 79, and may be stored, for example, within folder 76, by module 77, for example). In some embodiments, software module 67 on server 15 may be a sorting software module, and may perform or initiate the acts of receiving the e-mails (e.g., act 215), searching for keywords or identifying numbers (or both) and extracting the particular information (e.g., in act 220), and in some embodiments, transmitting or sending (e.g., act 235) the particular information. In some embodiments, the particular information may be the same or similar to the fraction of the information described herein, for example, with reference to acts 220 to 235.

In many embodiments, method 200 also includes acts of repeating, for example, multiple times, the searching (e.g., part of act 220), the extracting (e.g., part of act 220), and the sending (e.g., act 235). Various embodiments of such methods may be performed in various orders and may include additional acts. For example, in some embodiments, method 200 may include, (e.g., for each of a plurality of the users 21 to 23), after the extracting of the particular information (e.g., in act 220), and before the sending of the particular information (e.g., in act 235), for example, to the user's mobile phone (e.g., 41 to 43), acts of encrypting the particular information (act 225), compressing the particular information (act 230), or both. In some embodiments, the information sorting software module (e.g., 67), extracts the particular information (e.g., in act 220) only from a fraction of the select e-mails. In such embodiments, the e-mails may be searched for keywords or identifying numbers (or both) (e.g., in act 220, or in a previous operation), and the particular information may be extracted or selected (e.g., in act 220) only from the e-mails that have those keywords or identifying numbers.

Further, in some embodiments, for at least a plurality of the users, before the receiving of the (e.g., select) e-mails (e.g., in act 215), method 200 also includes an act of configuring the user's e-mail handling software module (act 212). For example, the user's e-mail handling module may be configured to automatically forward incoming e-mails from at least one particular third party (e.g., 31 to 33) to information sorting module 67. In such embodiments, the select e-mails mentioned herein may include (or be) the incoming e-mails from the (at least one) particular third party (e.g., one or more of third parties 31 to 33). As an example, plug-in 17 may be added to MICROSOFT OUTLOOK on computer 13 of user 23, and may provide functionality to automatically forward e-mails that are sent to an e-mail account of user 23 from particular senders to module 67 (e.g., via the Internet 10).

In other embodiments, a user's e-mail handling module may be configured, or a plug-in or software module may be added, that will search e-mails for keywords or identifying numbers (or both), select the particular information, perform tasks associated with act 220 or even acts 220 to 235, or a combination thereof, as examples, which may result in a select set of e-mails, the particular information, a fraction of the information, nuggets of information, or the like. In such embodiments, the users computer (e.g., computer 13 of user 23), or software running on the computer (e.g., plug-in 14 on computer 13), may perform tasks described herein for software module 67. In some such embodiments, software module 67 may not be needed. In other embodiments, on the other hand, some or all of such tasks may be performed at server 15, software module 61, or software module 67, as examples. In different embodiments, tasks described herein as being performed by modules 14, 17, and 67, may in other embodiments be described by others of such modules.

Moreover, some examples of method 200 further include, for at least a plurality of the users (e.g., 21 to 23), for example, before the receiving of the select e-mails (e.g., in act 215), instructing (e.g., in act 205) at least one particular third party (e.g., of 31 to 33) to send e-mails containing information about the business of the user to the information sorting module (e.g., 67). These select e-mails may include (or be), for example, e-mails containing information about the business of the user. In various embodiments, the users (e.g., 21 to 23) may provide these instructions through the Internet 10 (e.g., user 23 may provide these instructions via computer 13), through their mobile phones (e.g., 41 to 43), or both. In addition, in various embodiments, users (e.g., 21 to 23) may provide these instructions through module 61 or website 65, or directly to the third parties (e.g., 31 to 33), for example, through the Internet 10, mobile phone network 40, or both.

In some embodiments, as another example, the searching of the e-mails (e.g., in act 220 or otherwise) includes (e.g., for each of a plurality of the users), searching for e-mails from at least one particular sender, and the extracting of the particular information (e.g., in act 220) includes extracting the particular information only from the e-mails from the at least one particular sender.

In particular embodiments, (e.g., for each of a plurality of the users), method 200 may include acts of receiving instructions (e.g., in act 205) from the user (e.g., one of users 21 to 23), and identifying at least one criteria or threshold for alarm for at least a portion of the particular information. In some such embodiments, after the extracting of the particular information (e.g., act 220), method 200 may include comparing (e.g., in act 240) at least a portion of the particular information to the criteria or threshold for alarm, and providing an alarm (e.g., in act 245) to the user (e.g., one of users 21 to 23) if the particular information satisfies the criteria or passes the threshold, as examples.

For instance, in some such methods, (e.g., for each of a plurality of the users), the particular information includes financial account information including an amount of a withdrawal or a debit from an account, and the threshold is an amount of the withdrawal or debit beyond which the alarm is provided (e.g., in act 245). In another example, (e.g., for each of a plurality of the users), the particular information includes travel information including a departure time or a departure location (or both), and an alarm is provided (e.g., in act 245) if (e.g., as determined in decision activity 240) there is a change in the departure time or the departure location (or both). In specific embodiments, for example, the travel information includes flight information, for instance, including the departure time and a departure gate, and the alarm is provided (e.g., in act 245) if there is a change in either the departure time or the departure gate.

Still other embodiments include, (e.g., for at least a plurality of the users 21 to 23), upon instruction by the user (e.g., user 21), transmitting (e.g., act 255) at least a portion of the particular information to a third party (e.g., 22) mobile phone (e.g., 42) for instance, through mobile phone network 40, for storage on the third party mobile phone (e.g., 42), for access by the third party (e.g., user 22). In some such embodiments, the at least a portion of the particular information (e.g., transmitted in act 255) does not include a complete e-mail (e.g., an e-mail received by user 21 or by module 67, and forwarded to user 22). As an example, in some embodiments, the (at least a portion of the) particular information includes a travel itinerary (e.g., of user 21). Thus, user 21 can easily send his travel itinerary (or other of the particular information) to another person, to facilitate such communication.

Turning now to FIG. 3, this flowchart illustrates, among other things, various methods of authorizing an action and various methods of authenticating access, as examples. Most of the various acts of method 300 may be performed, for example, in an automated process, for instance, by server 15, module 61, or both, shown in FIG. 1. In various embodiments, method 300 may be performed by a company or business, for instance, as a service for other companies or businesses, or the like.

In the embodiment illustrated, in various methods of authorizing an action, method 300 includes receiving (act 303), for example, from a person having authority to authorize the action, an identification of a first phone number for obtaining authorization for the action. Such a person having authority to authorize the action may be, for example, one of users 21 to 23 shown in FIG. 1. In some embodiments, the person having authority to authorize the action may provide the phone number (e.g., received in act 303) through their computer or mobile phone, for example. For instance, if user 23 is the person having authority to authorize the action, user 23 may provide the phone number (e.g., received in act 303) of phone 43 via phone 43 or via computer 13 and website 65.

In some embodiments, the person having authority to authorize the action may enter or key in the phone number directly, while in other embodiments, the person (e.g., user 23) may enter or select a name, for example, or other identifier or indicia, which may be used (e.g., in act 303, for instance, by server 15 or module 61) to look up the appropriate phone number (e.g., of phone 43). In some embodiments, the person having authority to authorize the action may select the phone number, for example, from a menu, or the number may be read automatically from the person's phone or from a caller ID feature or service when the phone is used. As used herein, all such are examples of acts (e.g., 303) of receiving, from a person having authority to authorize the action, an identification of a first phone number for obtaining authorization for the action.

In the embodiment illustrated, method 300 also includes an act (309) of receiving, for instance, from a person seeking the action, a request for authorization of the action. In different embodiments, acts 303 and 309 may occur in either order, including, for example, the order shown in FIG. 3. In different embodiments or different situations, the person seeking the action (e.g., who requests authorization in act 309) and the person having authority to authorize the action (e.g., who provides the number in act 303) may be the same person, or may be different people (e.g., of users 21 to 23).

After the receiving of the identification of the first phone number (e.g., in act 303), and after the receiving of the request for authorization (e.g., act 309), in the embodiment illustrated, method 300 also includes an act (315) of sending a first message, for example, through a mobile phone network (e.g., 40 shown in FIG. 1) to a first mobile phone, for instance, having the first phone number. In such embodiments, the first message (e.g., of act 315) may include a description of the action for which authorization is requested, for example. In some embodiments, the first phone message is sent (e.g., in act 315) automatically, meaning herein that other than making the request for authorization (e.g., received in act 309), and providing the number and any criteria (e.g., received in one or both of acts 303 and 309), no human interaction is involved (i.e., between acts 309 and 315).

In addition, in the embodiment illustrated, after the sending of the first message (e.g., after act 315), method 300 includes an act (321) of receiving, for example, from the first mobile phone, (i.e., having the first phone number) a second message, which may authorize the action. In various embodiments, the second message (e.g., received in act 321) may be the result of the person who controls the phone taking an affirmative action to indicate authorization of the action (act 318). Act 318 may be performed, by one of users 21 to 23 shown in FIG. 1, for example.

In some embodiments, the first message (e.g., of act 315) includes at least one menu and at least one prompt to authorize the action by making a selection from the menu. The person who controls the phone may take an affirmative action to indicate authorization of the action (act 318) by making a selection from the menu, for example. In some embodiments, authorization is indicated (act 318) and the second message authorizing the action is sent (e.g., which is received in act 321) by pressing, for example, a single button on the mobile phone, after the first message (e.g., sent in act 315) is received by the mobile phone. As used herein, "pressing a single button" does not include such actions such as opening a flip phone, scrolling to view a message, or pressing "send". In other words, when determining how many buttons have been pressed, opening a flip phone, scrolling to view a message, or pressing "send", are not counted.

In some embodiments, the first message (e.g., sent in act 315), the second message (e.g., received in act 321), or both, are SMS messages. One or both (e.g., of the first and second messages sent in act 315 and received in act 321, respectively) may be transmitted (e.g., sent and received) through the mobile phone network (e.g., 40 shown in FIG. 1). Further, in some embodiments, the first message, (e.g., sent in act 315), the second message (e.g., received in act 321), or both, are voice message, as further examples, which may be computer generated, interpreted using voice recognition software, or both, as examples. In some embodiments, the first message (e.g., sent in act 315), may be a voice message, while the second message (e.g., received in act 321), is an SMS message. Other embodiments may have other combinations.

In the embodiment illustrated, method 300 also includes an act (327) of evaluating whether the second message (e.g., received in act 321) authorizes the action. If so, then (in act 330) the action may be allowed, facilitated, or performed, as examples. Some embodiments include an act of allowing the action (act 330) only if the second message is received (e.g., in act 321) and the second message authorizes the action (e.g., as determined in act 327). Some embodiments further include repeating the receiving of the request for authorization of the action (e.g., act 309), the sending of the first message (e.g., act 315), and the receiving of the second message (e.g., act 321). These acts may be repeated, for example, for requests for different actions, requests for the same action for different people, requests for the same action or same person at different times, etc.

Further still, some of these embodiments further include an act (312) of encrypting the first message, for example, before the sending of the first message (e.g., act 315), for instance, to the first mobile phone. Some embodiments also (or instead) include an act (324) of decrypting the second message, for example, after the receiving of the second message (e.g., act 321), for instance, from the first mobile phone. In such embodiments, the first mobile phone may decrypt the first message and encrypt the second message, as examples. In some embodiments, compression and decompression may also (or instead) be utilized.

In some embodiments, prior to the receiving of the request for authorization of the action (e.g., act 309), the first phone number is received (e.g., in act 303) through an Internet website (e.g., website 65 via the Internet 10 shown in FIG. 1), the mobile phone network (e.g., 40), or both. Some embodiments further include an act (306) of receiving, for instance, through an Internet website (e.g., website 65 via the Internet 10) or a mobile phone network (e.g., 40), or both, for example, from each of at least a plurality of persons having authority to authorize the action, an indication of a criteria for obtaining authorization for the action, for instance, for that particular person. Such a criteria may be typed in or entered verbally by the person, or may be selected by the person from one or more menus, for example. In some embodiments, act 306 may be similar to act 205 shown in FIG. 2 and described herein. Further, in some embodiments, act 303 may be included within act 306 or vice versa, or acts 303 and 306 may be performed in another order.

As an example, in some embodiments of method 300, act 306 includes receiving, for instance, from the person having authority to authorize the action, through at least one of the Internet website (e.g., website 65 via the Internet 10 shown in FIG. 1) and the mobile phone network (e.g., 40), an identification of time limits for sending the first message (e.g., in act 315). In many such embodiments, the sending of the first message (e.g., act 315) may be performed only in accordance with the time limits. For example, in some embodiments, the person may not want to be prompted for certain kinds of authorization during certain nighttime hours, and may enter a criteria or make selections accordingly.

In a number of embodiments, the person who controls the phone (e.g., who is in a position to indicate authorization in act 318) is, in fact, or is intended to be, the person having authority to authorize the action (e.g., from whom the number was received in act 303, criteria was received in act 306, or both). In other embodiments, the person who controls the phone is, in fact, or is intended to be, a person who is authorized by the person having authority to authorize the action (e.g., from whom the number was received in act 303, criteria was received in act 306, or both). Further, some embodiments provide certain assurances that the person who controls the phone is the correct person.

For example, in some embodiments, the second message (e.g., received in act 321) includes a password or an authorization code which has been memorized by the person having authority to authorize the action and keyed into the first mobile phone (e.g., in act 318) after receiving the first message (e.g., sent in act 315) and before sending the second message (e.g., received in act 321). As another example, certain embodiments include, for example, in the first message (e.g., in act 315), an act of asking a personal question about the person having authority to authorize the action who is expected to be in control of the mobile phone. Such embodiments may also include, in the second message (e.g., in act 321), an act of receiving a present answer to the personal question. Such embodiments may further include (e.g., in act 327) an act of comparing the present answer to a previous answer to the personal question provided (e.g., in act 306), for instance, by the person having authority to authorize the action.

In a number of embodiments, the first message (e.g., sent in act 315) identifies the person seeking the action. And in some embodiments, the first message (e.g., sent in act 315) also (or instead) identifies the action being requested (e.g., in act 309). Such information may be valuable, for example, in embodiments or situations where the person requesting the authorization (e.g., in act 309) is different than the person who has the authority to authorize the action (e.g., that provided the number received in act 303, to which the first message was sent in act 315, who indicates the authorization in act 318, etc.). In some embodiments, on the other hand, the first mobile phone is controlled by the person seeking the action (e.g., who requests the authorization received in act 309), and in some embodiments, the person seeking the action (e.g., who requests the authorization received in act 309) is the same person having authority to authorize the action (e.g., in act 303, act 318, or both).

Moreover, some embodiments further include an act (e.g., within act 306) of receiving, from the person having authority to authorize the action, for instance, through the Internet website (e.g., website 65 via the Internet 10 shown in FIG. 1) or the mobile phone network (e.g., 40), or both, an identification of a second phone number for advising a third person of the action (e.g., the action for which a request is received in act 309, which is allowed in act 330, or both). Some such embodiments include an act (e.g., 333), for example, after receiving the request for authorization (e.g., in act 309), of automatically sending the first message, the second message, a third message, or a combination thereof (e.g., in act 333), to the second phone number. The act (333), of notifying the third parson, may include, for example, sending a description of the action for which authorization is requested, identifying the person requesting the action (e.g., in act 309), or both, as examples.

In the embodiment illustrated, method 300 further includes act 336 of tracking the authorization granted for the action over time, which may include reporting results of the tracking. For example, a report may be issued which may indicate which authorizations were requested (e.g., in act 309), when authorizations were requested, who requested such authorizations, whether and when authorizations were granted (e.g., in act 318), and whether or when actions were allowed (e.g., in act 330). In some embodiments, such a report or data may be provided (e.g., in act 336) to or through the (e.g., first or second) mobile phone, for example, as SMS messages or nuggets of information described herein, as examples.

In some embodiments, information may be provided via a local signal (received in act 307). Act 307 may be similar to act 260 shown in FIG. 2 and described herein with reference thereto. A local signal may be received (e.g., in act 307), for example, via local communications devices 88 and 82 shown in FIG. 1 and described herein with reference thereto, wherein device 88 is receiving and device 82 is transmitting. A local signal may be received (e.g., in act 307), via NFC, for instance, and may be received (e.g., in act 307) when the mobile phone is passed by a reader (e.g., device 88).

In different embodiments, different types of actions are requested (e.g., in act 309), authorized (e.g., in act 318), and allowed (e.g., in act 330). Some embodiments are limited to particular types of actions. For example, some actions involve providing access, physical or otherwise, and some embodiments involve transfer of funds or money from one entity or account to another, for instance. As a specific example, in some embodiments, the action is granting of computer access to electronically stored information, and the person seeking the action (e.g., requesting the authorization in act 309) is seeking the computer access to the electronically stored information. Embodiments of method 300 may be used to provide computer access, for example, instead of a password, if a password has been forgotten, or in addition to a password, for example, to provide an added level of security in case an unauthorized user has obtained the password. In some such embodiments, the first message (e.g., of act 315) may include a description of the computer access or electronically stored information for which authorization is requested.

In another example, the action is granting of physical access to a controlled space and the person seeking the action (e.g., requesting the authorization in act 309) is seeking the physical access to the controlled space. Physical access may be controlled, for example, to a building, part of a building, a floor of a building, a room, an enclosure, a compound, a storage area, a parking area, a road, furniture such as a desk or filing cabinet, a safe, etc. In such embodiments, physical access may be allowed (e.g., in act 330), for example, by electronically unlocking or opening a door, gate, or compartment, by allowing an elevator to reach a particular floor, etc. In such embodiments, the first message (e.g., of act 315) may include a description of the room, floor, building, space, etc., for which authorization for access is requested.

In another specific example, in particular embodiments, the action (e.g., requested in act 309, authorized in act 318, allowed in act 330, or a combination thereof) is (or includes) a financial transaction, the first message (e.g., sent in act 315) includes an amount of the transaction, and the second message (e.g., received in act 321) includes an authorization (e.g., from act 318) of the transaction. Some such embodiments include (e.g., in act 306), receiving from the person having authority to authorize the action, for example, through an Internet website (e.g., website 65 via the Internet 10 shown in FIG. 1) or a mobile phone network (e.g., 40), or both, an identification of a threshold monetary value of transactions. In some such embodiments, the first message is sent (e.g., act 315) for transactions exceeding the threshold, and transactions below the threshold are approved or authorized without sending the first message (e.g., without acts 312 through 327).

Further, in some embodiments, the transaction is (or includes) a withdrawal or a debit from a bank account and the person having authority to authorize the action is an authorized user of the account. Thus, in some embodiments, a user (e.g., 21 to 23 shown in FIG. 1) can elect (e.g., in selecting or indicating the criteria that is received in act 306) to be notified via their phone (e.g., 41 to 43) of large withdrawals or debits (e.g., in act 315), but not to be bothered (e.g., by a first message sent in act 315) with smaller (e.g., routine) withdrawals or debits. Furthermore, in a number of embodiments, the user must authorize (e.g., in act 318) the larger transactions, thus protecting the user, the bank (or other financial institution), or both from losses resulting from unauthorized withdrawals or debits.

In some embodiments, the first message (e.g., sent in act 315) may include the balance of the account, and even where debits or withdrawals have been authorized, method 300 may help the user to avoid overdrawing the account. And in some embodiments, the user can choose the threshold amount above which authorization is required. As used herein, accounts held at credit unions and other businesses that receive deposits of funds from various customers, hold the funds in accounts, and return the funds to the customers upon request, are considered to be "bank accounts".

In another example, in particular embodiments, the transaction (e.g., requested in act 309, authorized in act 318, allowed in act 330, or a combination thereof) is (or includes) a bank card expenditure made at a point of sale for a purchase of goods or a payment for services. In some such embodiments, the person having authority to authorize the action is an authorized user of the bank card. In some such embodiments, the bank card has a bank card number, and the method further comprises, for example, before the sending of the first message (e.g., in act 315), an act of receiving the bank card number from the first mobile phone via a local signal transmitted from the first mobile phone (e.g., where the local signal is received in act 307).

In certain embodiments, as another example, the transaction (e.g., requested in act 309, authorized in act 318, allowed in act 330, or a combination thereof is (or includes) an expenditure made from a credit or debit account at a point of sale for a purchase of goods or a payment for services, the person having authority to authorize the action (e.g., user 22) is an authorized user of the account, the account has an account indicia, and the method further includes, before the sending of the first message (e.g., act 315), an act of receiving (e.g., act 307) the account indicia from the mobile phone (e.g., 42) via a local signal transmitted from the mobile phone (e.g., from communication device 82). As used herein "account indicia" includes credit card numbers, debit card numbers, and combinations of letters, numbers, symbols, or a combination thereof, that identifies an account from which a user can make credit or debit charges using the indicia.

In further examples, in some embodiments, the transaction (e.g., the approval of which is the action requested in act 309, authorized in act 318, allowed in act 330, or a combination thereof) is (or includes) an expenditure made from a credit or debit account at a point of sale for a purchase of goods or a payment for services, the person having authority to authorize the action is an authorized user of the account, and the second message (e.g., received in act 321) includes an authorization code which has been memorized by the person having authority to authorize the action and keyed into the first mobile phone after receiving the first message (e.g., sent in act 315) and before sending the second message (e.g., received in act 321). The keying in of the authorization code may constitute, or be included within, the act of indicating authorization (act 318), for example.

In addition, in some embodiments, the transaction (e.g., the approval of which is the action requested in act 309, authorized in act 318, allowed in act 330, or a combination thereof) is (or includes) an expenditure made from a credit or debit account at a point of sale for a purchase of goods or a payment for services, the person having authority to authorize the action is an authorized user of the account, the account has an account indicia, and the second message (e.g., received in act 321) includes the account indicia. In an example of such an embodiment, a customer provides a merchant with his phone number, either verbally or by keying it into a key pad, as examples. Then the merchant sends or causes to be sent the first message (e.g., in act 315) to the customer's mobile phone. Then the customer presses one or more buttons on the phone to indicate authorization of the transaction (e.g., act 318), and the phone sends the second message (e.g., received in act 321) to the merchant, along with the customer's credit or debit card number to be charged.

In other embodiments, the customer's phone number may be received by the merchant via a local signal (e.g., in act 307) when the customer passes his mobile phone by a local receiver (e.g., reader or device 88 shown in FIG. 1). And in other embodiments, the acts of sending the first message (315), receiving the second message (321), or both, may be performed by a service provider rather than directly by the merchant. In some embodiments, the second message (e.g., received in act 321) is (or includes) an SMS message received through the mobile phone network (e.g., 40) and method 300 further includes, before the act of sending of the first message (e.g., act 315), an act of receiving from the person seeking the action, or from the first mobile phone, the first phone number. In different embodiments, or different situations, the person seeking the action may provide the phone number verbally, through a keyboard, or by passing the phone by a reader (e.g., device 88), as examples.

Other methods of authenticating a transaction that are illustrated by FIG. 3 include (at least) the act of receiving through an Internet website (e.g., 65) or a mobile phone network (e.g., 40) (or through both), from each of multiple users (e.g., 21 to 23), for instance, an indication of a criteria for the user for obtaining authorization for transactions (act 306). Such embodiments may also include, for each of at least a plurality of the users (e.g., 21 to 23), an act of sending a first automated message (e.g., act 315), for example, through mobile phone network (e.g., 40) to a mobile phone (e.g., 41 to 43) of the user, the message containing an amount of the transaction and requesting an affirmative action (e.g., in act 318) to indicate authorization of the transaction. And such methods may also include, for instance, for each of at least a plurality of the users (e.g., 21 to 23), receiving from the mobile phone (e.g., 41 to 43) of the user, a second message (e.g., in act 321) indicating that the user (e.g., 21 to 23) of the mobile phone has taken the affirmative action (e.g., in act 318) to indicate authorization of the transaction.

Such an affirmative action (e.g., in act 318) may be pressing a button, making a selection from a menu, entering a voice command, entering a password or authorization number, etc. Various examples of actions that may be allowed (e.g., in act 330) in different embodiments are described herein. In a number of different embodiments, such acts may be combined in various combinations or with other acts or features (or both) described herein.

In addition to other things, FIG. 3 also illustrates various methods of authenticating access. In particular examples, such embodiments of method 300 include, (e.g., in the order illustrated, or in another suitable order) various acts. Some such embodiments include, for example, the act of receiving from a person seeking access (e.g., from one of users 21 to 23 shown in FIG. 1), identification indicia for the person seeking the access (e.g., in act 309). In various such embodiments, the identification indicia may be or include the name of the person, a user ID or identification number for the person, or the phone number for the person, as examples.

Some embodiments include, for example, after the act of receiving the identification indicia (e.g., act 309), and before the act of sending of the first automated message (e.g., act 315), an act (310) of looking up the requester (e.g., the person who made, or allegedly made, the request for authorization in act 309). In particular embodiments, this (e.g., act 310) may involve looking up the identification indicia (e.g., received in act 309) in a database (e.g., in storage 64), and obtaining from the database a phone number for the mobile phone of the person having authority for the access (e.g., to which the first message is sent in act 315).

In embodiments where the identification indicia includes the phone number for the mobile phone of the person having authority for the access (e.g., to which the first message is sent in act 315), the act of looking up the requester (e.g., act 310) may involve verifying that the phone number corresponds to that of a (or the) person having authority for access. In embodiments where the request for authorization (e.g., received in act 309) includes more than one indicia, the act of looking up the requester (310) may include verifying that some or all of the indicia are consistent, correspond to the same person, are correct, etc.

In a number of embodiments, method 300 may also include an act of sending a first (e.g., automated) message (e.g., act 315), for example, through mobile phone network 40 shown in FIG. 1, to a mobile phone of a person (e.g., identified in act 309 or 310) having authority for the access. In such embodiments, "automated" means that the first message is sent (e.g., in act 315) by machines, for example, by one or more computers, servers, software, or the like. For example, in some embodiments, the first message is sent (e.g., in act 315) by server 15, software module 61, or both, shown in FIG. 1, in response to receiving the request for authorization (e.g., in act 309). In some embodiments, the first (e.g., automated) message is sent (e.g., in act 315) to the phone number of the person identified in act 310 as having authority for the access.

In some of these embodiments, the act of sending the first message (e.g., act 315) includes or consists of sending the first message (e.g., through mobile phone network 40) to a mobile phone of the person seeking the access. In other words, the person seeking access and the person having authority for access are, or are assumed to be, the same person, in some embodiments. On the other hand, in other embodiments, the person seeking the access is a first person, the person having authority for the access is a second person (i.e., a different person). In many such embodiments, the first message (e.g., sent in act 315) includes an identification of the first person who is seeking the access. Such an identification may be, or include, part or all of the indicia (e.g., received in act 309), or that is obtained (e.g., in act 310) with reference thereto.

In some embodiments, the first automated message (e.g., sent in act 315) includes an identification of the access requested and a request for an affirmative action to indicate authorization of the access. In other embodiments, the first automated message (e.g., sent in act 315) includes a password. And in some embodiments, the first automated message (e.g., sent in act 315) includes an identification of the access requested, a request for an affirmative action to indicate authorization of the access, and a password.

Many such embodiments of method 300 also include the act of receiving the password (act 319), for example, from the person seeking the access. Further, many embodiments include the act of receiving, for example, from the mobile phone of the person having authority for the access, a second message (e.g., act 321) indicating, for example, that the person having authority for the access has taken the affirmative action to indicate authorization of the access. Some embodiments include act 319 but not act 321 (e.g., wherein the first message, sent in act 315, includes a password, but not a request for a response or a second message), some embodiments include act 321 but not act 319 (e.g., wherein the first message, sent in act 315, includes a request for a response or a second message, but not a password), and some embodiments include both act 319 and act 321 (e.g., wherein the first message, sent in act 315, includes a request for a response or a second message, and a password).

In a specific example, a number of embodiments involve sending the first automated message (e.g., act 315) through the mobile phone network (e.g., 40) to the mobile phone of the person having authority for the access, wherein the first automated message contains the password. Such methods may also include receiving the password from the person seeking the access (act 319). In some such embodiments, for example, the person seeking the access is seeking computer access to electronically stored information.

In a particular example, if a user (e.g., 23) attempts to log into a computer (e.g., 13) or a system (e.g., a personal area of website 65), but has forgotten his password, then the computer (e.g., 13) or system (e.g., module 61) may ask the user (e.g., 22) to identify himself, for example, by entering his name, user ID, phone number, or other identification indicia (e.g., in act 309). The computer (e.g., 13) or system (e.g., software module 61) may then look up (e.g., in act 310) the user's phone number in a database (e.g., in storage 64), or verify that the user's (e.g., 23) phone number is in the database, and then send the first message (e.g., in act 315) to the user (e.g., to his mobile phone 43) with the password. The user (e.g., 23) then receives the password on their mobile phone (e.g., via a SMS message, a voice message, or the like) and enters the password into the computer (e.g., 13) or system (e.g., website 65).

In different embodiments, such a password may be the original password, a temporary password, or a one-time use password, as examples. In other embodiments, instead of using such a process only when a password is lost or forgotten, the process may be used every time a person logs in, randomly, at regular intervals (e.g., of time or numbers of log ins), when an unauthorized user is suspected, in addition to requiring a password (e.g., for added security), or the like.

For additional security, for example, some embodiments further include the acts of asking the person seeking the access a personal question (e.g., in act 315), for example, about the person having authority for the access (which may be the same person, in some embodiments). Such a method may also include an act of receiving from the person seeking the access (e.g., in act 321) a present answer to the personal question. Some of these embodiments also include the acts (e.g., within act 327, a similar act occurring before act 321, or act 319) of comparing the present answer to a previous answer to the personal question provided (e.g., in act 306) by the person having authority for the access, and proceeding to allow the action (e.g., in act 330) or to send the first automated message containing the password (e.g., in act 321) only if the present answer matches the previous answer.

In some such embodiments, the first automated message (e.g., sent in act 315) contains the personal question and the second message (e.g., received in act 321) contains the present answer. Such a personal question may be, or include, as examples, "what is your mother's maiden name?", "what is your pet's name?", or "what is your favorite color?", or a combination or alternate selection thereof. Such questions may provide an added level of security, in some embodiments.

Certain embodiments of method 300 include the specific act of sending the first automated message (e.g., in act 315) through the mobile phone network (e.g., 40) to the mobile phone of the person having authority for the access, wherein the first message contains the identification of the access requested (e.g., received in act 309) and the request for an affirmative action to indicate authorization of the access. These embodiments may also include the specific act of receiving (e.g., in act 321), from the mobile phone of the person having authority for the access, the second message (e.g., indicating that the person having authority for the access has taken the affirmative action to indicate authorization of the access). Such an affirmative action may be, for example, making a selection from a menu, pressing a button on the phone, making a voice command, or the like.

For example, in some embodiments, the first (e.g., automated) message (e.g., received in act 315) includes at least one menu and at least one prompt to authorize the access by making a selection from the menu. In some such embodiments, the second message (e.g., received in act 321) either authorizes the access, or does not authorize the access (e.g., as determined in act 327) based upon which menu selection is made. In some such embodiments, failure to make a menu selection at all either results in the second message not being sent, or the second message being sent after a period of time indicating that the affirmative action has not been taken.

Some of these embodiments further include the acts of receiving a present password (e.g., when the request for authorization is received in act 309, in act 319, or in the second message in act 321) from the person seeking (e.g., in act 309) the access. Such methods may also include an act of comparing (e.g., within act 327, a similar act occurring before act 321, in act 310, or in act 319) the present password to a previous password stored in memory (e.g., in storage 64), and proceeding to provide the access (e.g., allow the access or action in act 330) only if the present password matches the previous password (e.g., as evaluated in act 327). In different embodiments, the password may be received (e.g., when the request for authorization is received in act 309, in act 319, or in the second message in act 321) through a local key pad or key board, through the user's mobile phone, verbally (e.g., using voice recognition software), etc.

Many different embodiments include other features or aspects, including those described herein. As some specific examples, in many embodiments, the first message (e.g., sent in act 315), the second message (e.g., received in act 321), or both, are SMS messages. Such messages may be received through mobile phone network 40, for example. Further, some methods further include the acts of encrypting (e.g., act 312) the first automated message (e.g., before the sending, in act 315, of the first automated message to the mobile phone of the person having authority for the access). Embodiments that include a second massage (e.g., received in act 321), may include (e.g., in addition to or instead of act 312) an act of decrypting (e.g., act 324) the second message (e.g., after the receiving, in act 321) of the second message from the mobile phone of the person having authority for the access). Further, some of these methods further include the act of receiving, for example, through Internet website 65, mobile phone network 40, or both, for instance, from each of at least a plurality of persons who have authority for access, an indication of a criteria for obtaining authorization for access for the person (e.g., in act 306).

In some embodiments, the access that is being sought (e.g., in act 309) is physical access. For example, in a number of embodiments, the act of sending the first automated message (e.g., act 315) includes, or consists of, sending the first automated message through the mobile phone network (e.g., 40) to a mobile phone of the person seeking the access (e.g., as requested in act 309), and the person seeking the access is seeking (e.g., in act 309) physical access to a controlled space. In other words, the person seeking the access (e.g., as requested in act 309) and the person having authority for the access (e.g., in act 303, 306, 321, or a combination thereof are the same person, and that person is seeking physical access. Such physical access may be, for example, physical access to enter a building or a floor or area of a building, or access to move a vehicle into a controlled space. Further examples of physical access are described elsewhere herein.

Further, in certain embodiments, the receiving of the identification indicia for the person seeking the access (e.g., in act 309) involves receiving a near-field communications signal from a mobile phone of the person seeking the access. For instance, user 22 may pass her phone 42 past NFC reader or communications device 88. In so doing, mobile phone 42 may transmit the indicia (e.g., of act 309) to device 88, which may be in communication with server 15, software module 61, or both, for example via the Internet 10. In different embodiments, such a NFC signal may also indicate the access or authorization requested (e.g., in act 309), or the selection of reader or device 88 may serve to indicate which access or authorization is requested (e.g., in act 309).

Turning now to FIG. 4, this flowchart illustrates, among other things, various methods of providing positional awareness, for instance, of a particular individual, for example, using mobile phones. In the embodiment illustrated, method 400 includes acts of obtaining (act 416) and storing (act 420) location information. Particular embodiments include (at least) the act of obtaining (act 416) or storing (act 420) (or both) at least one location coordinate defining at least one region of concern, for example. Such location coordinates may be (or include) global positioning system (GPS) coordinates, for example, latitude and longitude, grid coordinates, elevation, coordinates or distances from one or more known points, Cartesian coordinates, polar coordinates, or the like, as examples.

A region of concern may be defined by one such coordinate and a distance therefrom, by more than one coordinate and a distance therefrom (e.g., by two coordinates defining a line segment and a distance therefrom), or by three, four, or more coordinates, which may define a perimeter or parcel of land (e.g., four coordinates defining corners of squares or rectangles), as examples. In other embodiments, street addresses may be used. Location information or coordinates defining regions of concern may be obtained, for example, from a third party (e.g., 31 to 33 shown in FIG. 1), from an Internet website, through Internet 10, from a user (e.g., 21 to 23), or the like. In some embodiments, there may be a number of locations, regions of concern, coordinates, or the like, which may correspond to different regions of concern, which may be of concern for different reasons, in certain embodiments.

In the embodiment illustrated, method 400 also includes monitoring the location of a first mobile phone (act 424), which may be possessed by a particular individual, for example. Such monitoring may be, for example, continuous, at regular intervals of time, during certain times of the day, or the like, which may be selectable by the user in some embodiments. In some embodiments, the frequency of monitoring may be increased if the particular individual is near a region of concern. In the embodiment illustrated, method 400 also includes evaluating whether the first phone is near or within a region (act 428), for example, of concern, and providing an alarm (act 432), for example, through a second mobile phone, when the first mobile phone passes into a region of concern, or within a predetermined distance of a region of concern. Such a predetermined distance may be, for example, 25 feet, 50 feet, 75 feet, 100 feet, 200 feet, 300 feet, 500 feet, or the like, and may be user selectable, in some embodiments. In addition, or instead of alarming at the second phone, in some embodiments, an alarm may be provided (e.g., in act 432) at the first mobile phone, which may be the same or a different alarm, in different embodiments.

An alarm may be provided (e.g., in act 432) in a manner similar to other alarms described herein, for example, in act 245 shown in FIG. 2, or may be similar to the notification of the third person (act 333) or the first message (e.g., sent in act 315) shown in FIG. 3, or a combination thereof. An alarm (e.g., provided in act 432) may include a typical ringing of the phone, making a particular ring tone, a text or SMS message, a vibration, a synthetic voice message, one or more lights, or a combination thereof, as examples. The nature of the alarm (e.g., provided in act 432) may be selectable by the user, in many embodiments, for example, in an act similar to act 205, act 306, or both. In some embodiments, the alarm (e.g., provided in act 432) may identify the first phone, the person to which the first phone is assigned, the phone number of the first phone, a name of the region of concern, the reason why the region is of concern, how far away from the region of concern the first phone is located, uncertainty associated with such information, etc.

In some such embodiments, for example, the location coordinate (e.g., obtained in act 416, stored in act 420, or both) is for a reported residence of a registered sex offender. In some such embodiments, the first phone (e.g., of which the location is monitored in act 424) may be assigned to or used by a child, and the second phone (e.g., which receives the alarm in act 432) may be assigned to a parent or guardian of the child. Thus, the parent or guardian may be alerted (e.g., automatically) if the child enters or approaches the residence of a registered sex offender. In some embodiments, the alarm (e.g., provided in act 432) may indicate that the region of concern is the residence of a registered sex offender, in some embodiments, including details of the offender, crimes that he has been convicted or accused of, a description of him, a picture of him, etc.

In some embodiments, registered residences of a number of registered sex offenders may be obtained (e.g., in act 416), for example, through the Internet 10, for instance, from one or more governmental websites, which may be converted into coordinates, for example, demarking the property boundary, the center of the property, or the like. Location information may be stored (e.g., in act 420), for instance, on server 15, in storage 64, by software module 61, or the like, which may be temporary storage, for example, for the area in which the first mobile phone is located. Other information included in alarms (e.g., provided in act 432) may be obtained from the website(s) as well, in act 416, or both.

In other embodiments, regions of concern may be for other threats, such as traffic hazards, pollution or toxic waste sites, areas of high radioactivity, industrial areas, neighborhoods with high crime rates, gang-controlled areas, quarantine areas, areas with insect infestations, high-drug use or dealing areas, bars, adult establishments, houses of prostitution, gambling establishments, construction areas, areas of severe weather, areas of fighting in theater of war, forbidden areas, foreign territory, private land, areas below high tide, areas where rip-tides occur, areas of shallow water, coastlines, or other maritime navigational hazards, etc. Besides protecting children, embodiments may notify (e.g., in act 432), protect, or both, individuals with substance abuse, alcohol, or gambling problems, police officers, fire fighters, probation officers, parole officers, census workers, soldiers, delivery personnel, salesmen, missionaries, sailors, etc. In some embodiments, the alarm (e.g., provided in act 432) may be provided to the first phone, in addition to, or instead of the second phone.

In some embodiments, special software may be provided on one or more mobile phones to accomplish certain acts of the method (e.g., method 400). For instance, a number of embodiments of method 400 further include, for example, the acts of providing a first mobile phone software module for installation on the first mobile phone (act 404), providing a second mobile phone software module for installation on the second mobile phone (act 408), or both. In some such embodiments, the first mobile phone software module (e.g., provided in act 404) includes programming instructions for the monitoring (e.g., in act 424) of the location of the first mobile phone, for instance, possessed by the particular individual. And in some embodiments, the second mobile phone software module (e.g., provided in act 408) includes programming instructions for the providing of the alarm (e.g., in act 432), for example, through the second mobile phone when the first mobile phone passes into a region of concern or within the predetermined distance of a region of concern. In some embodiments, the first mobile phone software module (e.g., provided in act 404), the second mobile phone software module (e.g., provided in act 408), or both, may be similar, at least in some respects, or part of, the second software module 72 described herein, for example.

Particular embodiments of such methods (e.g., method 400) further include an act of obtaining or providing a third software module (act 412), for example, installed on at least one Internet server (e.g., 15) and forming at least one Internet website (e.g., 65). In some embodiments, the third software module (e.g., provided in act 412) may be similar, at least in some respects, or part of, the first software module 61 described herein, for example. In some of these embodiments, at least a plurality of users (e.g., users 21 to 23) visit the website (e.g., 65) through the Internet 10 and elect to be provided the alarm (e.g., in act 432) through their mobile phone, for example, through the second mobile phone. In various embodiments, information, criteria, selections, etc., may be received from the users (or potential users) for example, in acts similar to acts 205, 306, or both, shown in FIGS. 2 and 3 and described herein with reference thereto.

In a number of such embodiments, the third software module (e.g., obtained or provided in act 412) further contains instructions to download (e.g., in act 404), for instance, through mobile phone network 40, for example, to the first mobile phone, the first mobile phone software module. In many such embodiments, the first mobile phone software module (e.g., provided or downloaded in act 404), the third software module (e.g., obtained or provided in act 412), or both, includes programming instructions for the monitoring (e.g., in act 424) of the location of the first mobile phone, for instance, possessed by the particular individual. Further, in some such embodiments, the third software module (e.g., obtained or provided in act 412) further contains instructions to download (e.g., in act 408), for instance, through mobile phone network 40, for example, to the second mobile phone, the second mobile phone software module.

In many such embodiments, the second mobile phone software module (e.g., provided or downloaded in act 408) includes programming instructions for the providing of the alarm (e.g., in act 432), for instance, through the second mobile phone when the first mobile phone passes into the region of concern or within the predetermined distance of the region of concern. And in particular embodiments, the first mobile phone software module (e.g., provided or downloaded in act 404) also, or instead, includes programming instructions for the providing of the alarm (e.g., in act 432), or instance, through the first mobile phone when the first mobile phone passes into the region of concern or within the predetermined distance of the region of concern.

Moreover, in many embodiments, at least a plurality of the users (e.g., 21 to 23) enter (e.g., in act 416), for example, through the Internet website (e.g., 65) at least one location coordinate defining at least one region of concern. Thus, in different embodiments, some or all of the regions of concern may be of specific concern to the particular user. On the other hand, in some embodiments, the third software module (e.g., obtained or provided in act 412) further contains instructions to obtain from a third party website (e.g., from one or more of third parties 31 to 33), data with which to determine at least one location coordinate defining at least one region of concern. An example of such data includes street addresses, which may be used to determine longitude and latitude or GPS coordinates, for example. In some such embodiments, for example, the third party website contains reported residence addresses or locations for a plurality of registered sex offenders, there are at least a plurality of regions of concern (e.g., monitored in act 424), and at least a plurality of the regions of concern surround at least one of the reported residences of the registered sex offenders, as examples.

Some or all of the acts of method 400, or other methods described herein, may be repeated. For example, in many embodiments, location information may be obtained (e.g., act 416) and stored (e.g., act 420) periodically, when the first phone moves into another area, when new information becomes available, or the like. Further, in some embodiments, location information that is stored (e.g., in act 420) may be used many times (e.g., in acts 424 and 428, and if appropriate, in act 432) between instances when location information is obtained (e.g., in act 416). In a number of different embodiments, the acts illustrated or described may be combined in various combinations or with other acts or features (or both) described herein.

Figure 5:
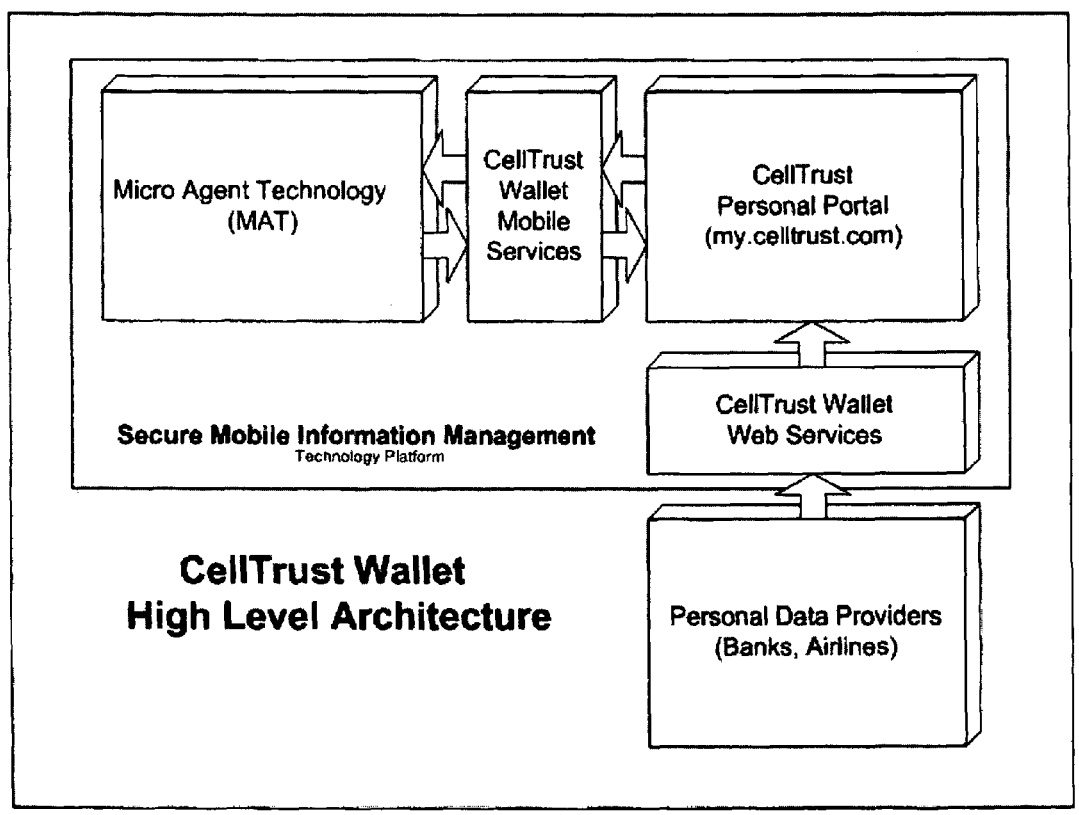
FIGS. 5 and 6 are block diagrams illustrating particular examples of systems of managing personal information for a number of users.
Figure 6:
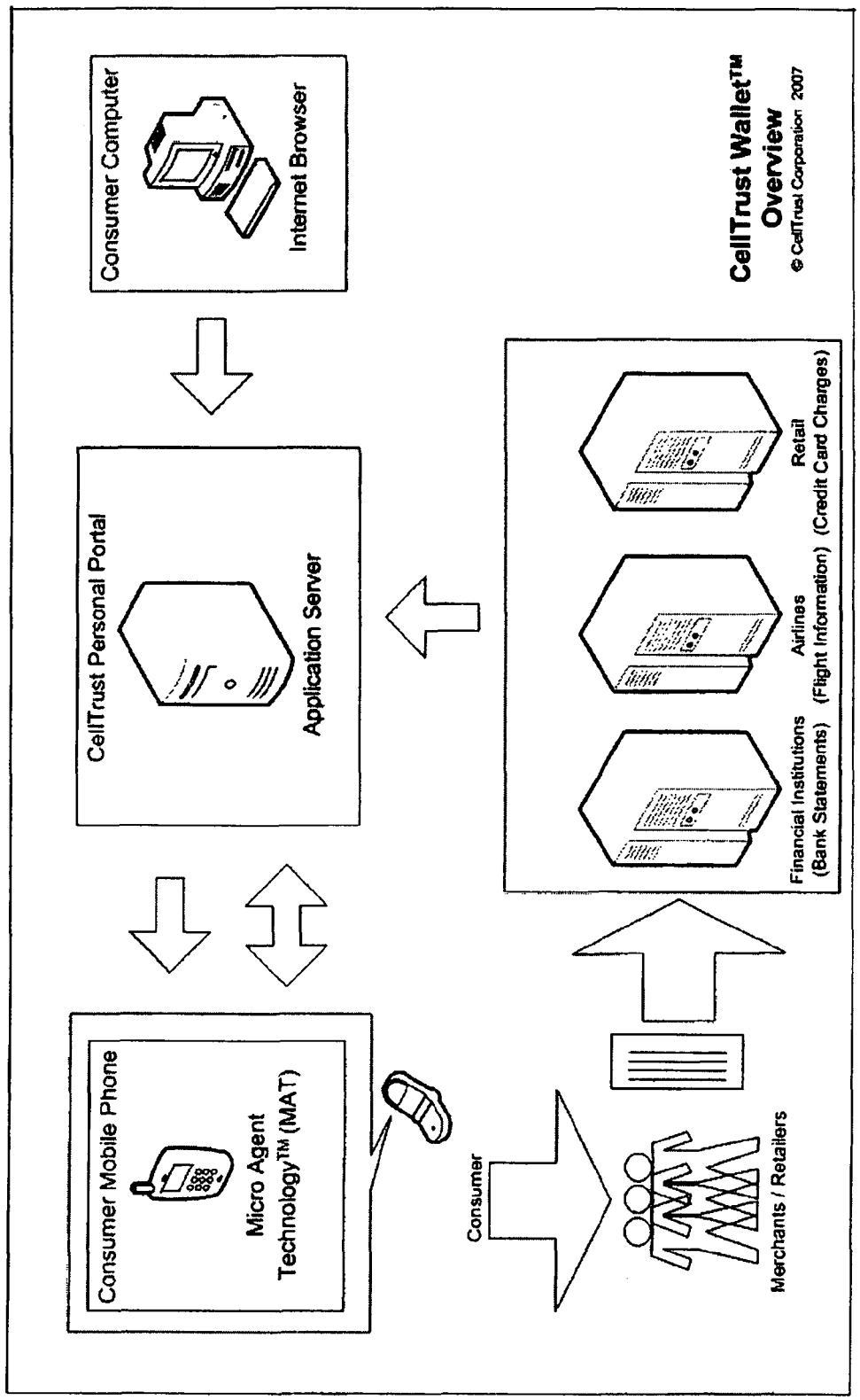

Referring now to FIGS. 5 and 6, in a particular embodiment of the invention, provided as an example, SECURE INFORMATION MANAGEMENT (SMIM) is an example of a platform for system 100 which enables mobile phone users (e.g., 21 to 23) to have access to certain personal information via their mobile phone (e.g., 41 to 43), in some embodiments, even when there is no signal or internet connection for the cell phone (e.g., from mobile telephone network 40). In this embodiment, SMIM includes one or more blocks of code that provide the framework and foundation of system 100 and encompasses functionality from defining standards under which development takes place to defining security, to communication between components and various core software applications.

In certain embodiments, SMIM includes MICRO AGENT and WEB SERVICES. In this example of an embodiment, MICRO AGENT runs on mobile phones, and is an example of the second software module 72, or a portion thereof, and WEB SERVICES is an example of first software module 61, or a portion thereof. In this example, WEB SERVICES is a block of code or software that runs on server 15 and that communicates with or exchanges data with MICRO AGENT on the phones, website 65, and secure storage 64, for example. WEB SERVICES may be a communication layer between MICRO AGENT, website 65, and storage 64, for instance. WEB SERVICES may provide or allow authentication, communication, protocol definition, auditing of the integrity of data, prevention of unauthorized access, and so on, and may allow access to website 65 from the Internet 10.

WEB SERVICES also, in this embodiment, allows third parties (e.g., 31 to 33) or Personal Data Providers to update their customer's accounts or personal information, for example, on, storage 64, website 65, or secure areas thereof. MICRO AGENT or second software module 72 provides a user interface, local storage, synchronization, and alerts components, in this embodiment, for instance, on one or more of phones 41 to 43. Further, in this particular embodiment, a user interface, for instance, within mobile phone 41 or second software module 72, may gather information from the user (e.g., 21) and provide information back to the user.

In some embodiments, local storage (e.g., folder 76 on mobile phone 41) enables the application (e.g., second software module 72) to store information (e.g., nuggets 78 and 79 of information) on the phone (e.g., 41), which may provide for faster access, reduce dependence on the network (e.g., mobile phone network 40, the Internet 10, or both), and may reduce the total cost of ownership by limiting the amount of data communication through mobile phone network 40 that takes place (e.g., at the expense of user 21). In some embodiments, the data (e.g., nuggets 78 and 79) on the phone (e.g., 41) is synchronized with data on server 15 to ensure that the user (e.g., 21) has access to updated information both on their phone (e.g., 41) and on the web (i.e., Internet 10, which may be accessed, at least by user 23, through computer 13, for instance).

In certain embodiments, data is compressed, encrypted, or both, for communication with the mobile phone or device (e.g., between MICRO AGENT and WEB SERVICES or between the first software module 61 and the second software module 72). In addition, in some embodiments, alerts may provide substantially real time notification of various events or activities that can be sent to a phone (e.g., 41) running MICRO AGENT (an example of module 72, or a portion thereof). For example, alerts may inform the user of an important or critical event such as a large withdrawal from their account or a flight cancellation, flight changes, gate changes, or the like. And in particular embodiments, WALLET MOBILE SERVICES or PERSONAL PORTAL (or both) provides a middle tier between an application running on a server (e.g., server 15) and a phone (e.g., 43) running MICRO AGENT. In addition, in some embodiments, PERSONAL PORTAL provides a middle tier between users (e.g., 23) operating on their computers (e.g., 13) and WALLET MOBILE SERVICES, MICRO AGENT, or both. In some embodiments, Wallet WEB SERVICES may provide information (e.g., from Personal Data Providers) to PERSONAL PORTAL, which may then be provided to WALLET MOBILE SERVICES, MICRO AGENT (e.g., on the mobile phones), or both.

Further, in certain embodiments, PERSONAL PORTAL (an example of part of first software module 61 or part of website 65) is a web application that enables users (e.g., 21 to 23) to access and modify various information, such as their personal information, such as their card information for example, on the web (e.g., through the Internet 10 and web site 65). In some embodiments, PERSONAL PORTAL uses WALLET MOBILE SERVICES to communicate and synchronize users' information with their mobile phone. In a number of embodiments, Wallet WEB SERVICES, PERSONAL PORTAL, WALLET MOBILE SERVICES, or a combination thereof, can also be used by third parties (e.g., 31 to 33) or Personal Data Providers to send, receive, or both, information to (or from) mobile phones (e.g., 41 to 43) running MICRO AGENT (e.g., second software module 72). For example, a bank such as WELLS FARGO may be able to send alerts to their customers' mobile phones (e.g., 41 to 43) and to provide them with the latest bank account information, for instance. Another example (e.g., of a third party 31 to 33) is an airline such as SOUTHWEST AIRLINES, which may send their customers (e.g., 41 to 43) up-to-the-minute gate and cancellation information, as appropriate.

In a particular example of an embodiment, SECURE INFORMATION MANAGEMENT, which includes embodiments of first software module 61 and second software module 72, provides functionality and features that include substantially secure storage of cards and information, including, for example, credit cards, bank cards, identification cards such as a driver's license to identify a person, loyalty cards, for instance, for grocery stores such as SAFEWAY, and ALBERTSONS, and retail stores such as The GAP, and STARBUCKS, frequent flyer programs, rewards programs, membership cards, video clubs, library cards, insurance cards, for instance, health, auto, or life, and login and password information, and the like. Various embodiments may provide a combination of the items or information described herein or (e.g., any information or data) that is typically found or has been known to have been carried in a person's wallet or purse, for example, or equivalent functionality.

Further, some embodiments of the invention include central, secured, and backed up storage, for example, through module 61, server 15, or both. In various embodiments, a user (e.g., 21 to 23) may enter the data once (e.g., into their phone 41 to 43, into website 65, etc.) and may use such information, for example, as long as it remains current. In addition, in particular embodiments, a user (e.g., 21 to 23) may be able to easily replace a particular phone (e.g., user 21 may be able to replace mobile phone 41), a carrier or service provider (e.g., of mobile phone network 40), or both, without re-entering personal information. Further, in this particular embodiment, a user (e.g., 21 to 23) may have access to their personal information from virtually anywhere (e.g., through their mobile phone).

In addition, particular embodiments that provide alerts to inform users of important changes, are configurable. In some such embodiments, the user (e.g., 21 to 23) may select which nuggets of information or changes are important to them such that the user should be alerted when the information is updated (e.g., immediately) and which should be stored for later review, for instance. Certain embodiments may provide immediate or near-immediate notification. Specifically, in some embodiments, a message may pop up on the mobile phone (e.g., 41 to 43) to alert the user (e.g., 21 to 23) of an event. In this embodiment, users can then bring up MICRO AGENT, or second software module 72, for detailed information about the event.

In some embodiments, a user can use MICRO AGENT, or second software module 72 to take an immediate action. For example, if the user is informed of a large withdrawal from their account, the user may be able to use MICRO AGENT, or second software module 72 to inform the bank (which may be one of the third parties 31 to 33 or a Personal Data Provider, for example) of possible fraud or mistake. Hence, in this particular embodiment, banks or other financial institutions may be able to limit their liability or reduce their losses by immediately putting the account under investigation. In various embodiments, users may take control of their data by putting their personal information in SMIM or system 100. In many embodiments, users' personal information is not stored on an employers' server where the employer controls the information and has the ability, or even the legal right, to access it. Further, in some embodiments, users (e.g., 21 to 23) can change jobs without the need for re-entering their data over again.

Moreover, certain embodiments of the invention may use mobile phones (e.g., 41 to 43) to provide certain identification card functions. For example, mobile phone 42 may be used to identify user 22. Personal information stored on a mobile phone, on server 15, or both, may include a driver's license number, a social security number, a passport number, visa information, security clearance information, credentials, a birth certificate, a green card, a work permit, a military ID, access cards, membership cards, elevator cards, copy cards, etc. In some embodiments, if cards or the phone are lost, destroyed, or stolen, a user may replace some or all access cards with a mobile phone. In various embodiments, a user may use a mobile phone to access a parking garage, an office building, secure labs, or other areas, for example. Further, in some embodiments, a user may use SMIM, Secure Mobile Services, or first software module 61 to locate employees, for example, immediately or within a certain time period. User 22 may be located, for example, by determining the location of the cell that phone 42 is within, by using GPS information from phone 42, or a combination thereof.

In a number of embodiments, SMIM or system 100 may be used in a retail sales environment. For example, in some embodiments, user 22 may use mobile phone 42 to retrieve product information about a product using a local signal such as Near Field Communication or Bluetooth, for example. In some embodiments, a user may use a phone to look up a location of a product, receive a coupon as the user enters a store, receive daily specials, store product information and price for price comparisons, or a combination thereof. In some embodiments, a user may send friends or family, for example, gift cards from a mobile phone, and a recipient may be able to redeem the gift certificate using their mobile phone. In certain embodiments, SMIM or system 100 may also allow users to purchase products in stores by payment with a phone, for example, charging a credit card, debit card, or the like. In particular embodiments, SMIM or system 100 also allows for secure communication between MICRO AGENT or second software module 72 and the website (e.g., 65) as well as secure SMS communication, for example, for transmitting sensitive information rather than text messaging using clear text.

Yet another embodiment of the invention includes or combines a phone with key card. An example is an apparatus for communicating a code, that includes a component for a mobile phone (or a mobile phone that includes the component) wherein the component includes a passive code configured to be read by a reader when the phone is passed in close proximity to the reader. In many of these embodiments, the reader is an apparatus, for example, as opposed to a person. The reader of this embodiment may be similar to communications device 88 shown in FIG. 1 and described herein, and may be a card reader configured to read passive codes from cards, for example, or similar thereto.

In certain embodiments, for example, the passive code is (or includes) a magnetic code and the reader is configured to read magnetic codes or the passive code is (or includes) a bar code and the reader is (or includes) a bar code reader. In some embodiments, the passive code is substantially unchangeable. As used herein, "substantially unchangeable" means that a typical user cannot change the passive code in a manner that is more convenient than replacing the component or the phone. Thus, a user cannot change their code on a whim, which a person reading the code may rely on, for example, to identify the user. Although not necessarily fool proof, in some of these embodiments, changing the passive code of a specific phone or component to copy the passive code of a different phone would be at least as difficult as making a duplicate of someone else's credit card, as a further example.

As used herein, "passive" or "passively" means to not be powered by the battery or electrical system of the phone or electrically connected to the phone (or another battery or electrical system). Further, as used herein, in this context, the "component" of the phone excludes disposable packaging for the phone (that may contain a bar code for product sales or tracking purposes, for example). Further, in some embodiments, for example, the component is (or includes) a back of the mobile phone, a battery cover of the mobile phone, a battery for the mobile phone or a case for the mobile phone, as examples.

Further, in some embodiments, for instance, the mobile phone has a phone number and the passive code includes (or is) the phone number of the mobile phone. Further, in some embodiments, for another example, the passive code includes (or is) a number that is unique to the component from all other components for mobile phones and all other mobile phones. In other embodiments, the passive code may be or include the name of the user, an indicia for the user, an indicia for an account, a portion thereof, or a combination thereof, as examples.

Various embodiments of the invention also (or instead) include a method to replace a back of a phone with key card. Another example of the invention is (or includes) a method of eliminating a need to carry a card. This method includes providing or obtaining a mobile phone having a component (or at least providing or obtaining a component for a mobile phone), wherein the component is configured to passively produce a code configured to be read by a reader (e.g., device 88) when the mobile phone, that includes the component, is passed in close proximity to the reader. (Some embodiments may require only proximity instead of close proximity, for example, using Bluetooth.) Such a method may include obtaining or providing components having one or more aspects described above for the example of the apparatus for communicating a code. Particular embodiments include providing the component as a replacement part for a preexisting mobile phone that previously did not have an ability to passively produce such a code.

Other embodiments include (or are) various methods to use a phone with a key card. An example of such an embodiment is (or includes) a method of identifying people, that includes, in the order indicated, or in another order, (at least) the acts of providing or obtaining at least one reader (e.g., device 88) configured to read a passive code from an apparatus containing the code that is passed within (e.g., close) proximity to the reader, permitting people who whish to be identified to pass their mobile phones (e.g., 42) within close proximity to the reader (e.g., device 88), for example, wherein the people (e.g., 22) who wish to be identified have the passive code located on their mobile phones (e.g., 42). Such methods may also include an act of using the passive code, as read by the reader (e.g., device 88), to identify the people (e.g., 22).

Such a method may be employed by a merchant, a service provider, an employer, a land lord, a manufacturer, a company, a school, or a government agency, for example. Further, such a method may include obtaining or providing components having one or more aspects described above for the example of the apparatus for communicating a code. In some embodiments, such a method may be used in combination with, or as part of, other methods described herein. In some embodiments, such a method or system may be used for a particular purpose, or for more than one purpose.

In particular embodiments, for instance, for each of at least a plurality of the people, the identity of the person is used to authorize an expenditure from a credit or debit account at a point of sale for a purchase of goods or a payment for services. In particular embodiments, as another example, for each of at least a plurality of the people, the identity of the person is used to authorize physical access to a controlled space. Further, in some embodiments, for each of at least a plurality of the people, the identity of the person is used to authorize computer access to electronically stored information. Even further, in some embodiments, for another example, the method further includes at least one other means for identifying the people. Such another means may be one of the means described herein, or known in the art, for example.

Still another embodiment is (or includes) a method of eliminating a need to carry a card. This example of a method includes replacing an old component of a mobile phone with a new component. In some embodiments, the new component includes at least one of a back, a battery cover, a battery, and a case for the mobile phone, as examples. In some embodiments, for example, the new component includes a magnetic code area configured to produce a magnetic code to be read by a card reader (e.g., device 88) when the phone is passed in close proximity to the card reader. Other embodiments may use a bar code, as another example.

Another embodiment is (or includes) another method of eliminating a need to carry a card. Such a method may include, for example, configuring a mobile phone with a component, wherein the component is or includes at least one of a back, a battery cover, a battery, and a case for the mobile phone, wherein, the component includes a code configured to be read by a card reader (e.g., device 88) when the phone is passed in close proximity to the card reader. Other embodiments include a method or phone that communicates a code using near-field communication, for example, wherein the code is stored on the phone, selected by the user, and transmitted via a NFC transmitter (e.g., device 82). Different uses are described herein wherein the codes are sent to the phone via the mobile phone network (e.g., 40) from a server (e.g., 15) or that collects the codes from third parties (e.g., 31 to 33) through the internet 10, for example.

Different embodiments of the invention may include different combinations of elements described herein, shown in the drawings, or known in the art. Benefits, other advantages, and solutions to problems have been described herein with regard to specific embodiments. However, the benefits, advantages, solutions to problems, and element(s) that may cause benefit, advantage, or solution to occur or become more pronounced are not to be construed as critical, required, or essential features or elements of the claims or the invention. Reference to an element in the singular is not intended to mean "one and only one" unless explicitly so stated, but rather "one or more." As used herein, the terms "comprises", "comprising", or a variation thereof, are intended to cover a non-exclusive inclusion, such that a process, method, article, or apparatus that comprises a list of elements does not include only those elements but may include other elements not expressly listed or inherent to such process, method, article, or apparatus. Further, no element described herein is required for the practice of the invention unless expressly described as "essential" or "critical".

What is claimed is:

1. A system of managing personal information for a plurality of users, each user having a mobile phone operating on a mobile phone network, the system comprising:
    at least one first software module operating on at least one server and forming at least one website wherein a plurality of users visit the website through the Internet and elect to have their personal information managed through the system using their mobile phones, and
    wherein the first software module provides secure storage for each user's personal information received from the user and from at least one third party acting on behalf of the user to provide information to the user, and
    wherein the first software module filters the personal information and selects nuggets of the personal information which the first software module sends to the mobile phone; and
    a second software module operating independently on at least a plurality of the mobile phones wherein the second software module is configured to receive the nuggets of the personal information of the user from the first software module through the Internet and through the mobile phone network, and to store the personal information on the mobile phone so that the personal information may later be accessed by the user even when the mobile phone is not connected to the mobile phone network, by viewing a folder containing nuggets organized by subject matter.

2. The system of claim 1 wherein, for at least a plurality of the users, the second software module is downloadable by users from the first software module to the mobile phones through the website and through the mobile phone network.

3. The system of claim 1 wherein, for at least a plurality of the users, the first software module includes instructions to search at least a plurality of e-mails for at least one of keywords and identifying numbers, and select the nuggets of the personal information from the e-mails using the at least one of the keywords and identifying numbers.

4. The system of claim 1 wherein, for at least a plurality of the users, the second software module contains instructions to allow the user to select at least a portion of the personal information that is stored on the mobile phone, select or enter an identifier of at least one of a third party and a third party mobile phone, and elect to send the at least a portion of the personal information to the third party mobile phone.

5. The system of claim 4 wherein, for at least a plurality of the users, the first software module further contains instructions to evaluate whether the third party mobile phone contains a copy of the second software module, and if the third party mobile phone contains a copy of the second software module, then to send the at least a portion of the personal information to the copy of the second software module on the third party mobile phone through the mobile phone network.

6. The system of claim 1 wherein, for at least a plurality of the users, the first software module further contains instructions to receive a command from the user through the mobile phone network, and upon the receipt of the command, to transmit at least a portion of the nuggets of the personal information to a different party through the Internet.

7. The system of claim 1 wherein, for at least a plurality of the users, the first software module contains instructions to receive a command from the user through the mobile phone network to dispute a financial transaction for a particular account described in the nuggets of the personal information, and upon the receipt of the command, to transmit a dispute of the transaction to a manager of the particular account through the Internet.

8. A method of managing information for at least a plurality of users using the Internet and mobile phones of the users, the method comprising in any order at least:
    for each of a plurality of the users, receiving a first set of personal information of the user from the user through at least one of the Internet and the mobile phone of the user, wherein the first set of personal information includes identification of a criteria for alarming;
    for each of a plurality of the users, receiving a second set of personal information of each user from at least one third party through a network;
    for each of a plurality of the users, selecting a fraction of the second set of personal information;
    for each of a plurality of the users, transmitting the fraction of the second set of personal information to the user's mobile phone through the mobile phone network for storage on the user's mobile phone using a second software module residing on the phone, wherein the second software module organizes the fraction of the second set of personal information and makes the fraction of the second set of personal information accessible to the user;
    for each of a plurality of the users, repeating at least a plurality of times the receiving of the second set of personal information; the selecting of the fraction; and the transmitting of the fraction; and
    for each of a plurality of the users, using the second software module, providing an alarm to the user if at least a portion of the fraction of the second set of personal information satisfies the criteria.

9. The method of claim 8 wherein, for each of a plurality of the users:
    the first set of personal information includes an identification of at least one financial account;
    the second set of personal information includes an identification of deposits into the account, withdrawals from the account, and a balance of the account; and
    the providing an alarm includes at least one of:
        alarming if a withdrawal exceeds a first threshold identified within the criteria;
    and alarming if the balance of the account drops below a second threshold identified within the criteria.

10. The method of claim 8 wherein, for each of a plurality of the users:
    the first set of personal information includes at least one of travel information and an identification of at least one of a common carrier and a travel agent;
    the second set of personal information includes identification of a departure time and a departure location; and
    the providing of an alarm includes alarming if there is a change in at least one of the departure time and the departure location.

11. The method of claim 8 further comprising, for each of a plurality of the users, using local signal transmitting hardware located on the user's mobile phone, and using the second software module, under the control of the user, transmitting a local signal comprising at least a portion of at least one of the first set of personal information and the second set of personal information to a reader within proximity to the mobile phone.

12. The method of claim 11 wherein, for each of a plurality of the users, the first set of personal information includes at least one of loyalty information and identification of at least one of a merchant and a service provider;

at least one of the first set of personal information and the second set of personal information includes the loyalty information;

the local signal includes at least a portion of the loyalty information; and the transmitting of the local signal includes transmitting the at least a portion of the loyalty information to at least one of the merchant and the service provider.

13. The method of claim 8, further comprising, in any order, for at least a plurality of the users, upon instruction by the user, transmitting at least a portion of the second set of personal information to a different party mobile phone through the mobile phone network for storage on the different party mobile phone, for access by the different party.

14. The method of claim 13 wherein the portion of the second set of personal information includes a travel itinerary.

15. The method of claim 8, further comprising, in any order, for at least a plurality of the users, upon command by the user, wherein the command is provided through the mobile phone of the user, transmitting at least a portion of the second set of personal information to a different party through the Internet.

16. The method of claim 8, further comprising, for each of a plurality of the users, before the transmitting of the fraction of the second set of personal information to the user's mobile phone, at least one of encrypting the fraction of the second set of personal information, and compressing the fraction of the second set of personal information, wherein the repeating includes repeating the at least one of the encrypting and the compressing.

17. The method of claim 8 further comprising, for each of a plurality of the users, using signal receiving hardware located on the user's mobile phone, and using the second software module, under the control of the user, receiving a local signal from a transmitter within proximity to the mobile phone.

18. The method of claim 8 wherein, for each of a plurality of the users, the second software module organizes the fraction of the second set of personal information based on topic and makes the fraction of the second set of personal information accessible to the user based on the topic of the information.

19. The method of claim 18 wherein, for each of a plurality of the users, the repeating includes replacing at least a portion of the fraction of the second set of personal information that is stored on the user's mobile phone, while maintaining the organization of the information based on the topic of the information.

20. The method of claim 18 wherein, for each of a plurality of the users, the repeating includes synchronizing at least a portion of the fraction of the second set of personal information that is stored on the user's mobile phone with corresponding personal information that was already stored on the mobile phone, while maintaining the organization of the information based on the topic of the information.

21. The method of claim 8 wherein the receiving of the first set of personal information, the receiving of the second set of personal information, the selecting of the fraction, and the transmitting of the fraction, are all performed by a first software module residing on a server connected to the Internet, wherein the first software module further forms at least one Internet website.

22. A method of managing information for at least a plurality of users using the Internet and mobile phones of the users, the method comprising in any order at least:

receiving a first set of personal information of the user from the user through at least one of the Internet and the mobile phone of the user; upon instruction by the user, downloading a second software module to the user's mobile phone through a mobile phone network;

receiving a second set of personal information of the user from at least one third party through a network; selecting a fraction of the second set of personal information;

encrypting the fraction of the second set of personal information;

transmitting the fraction of the second set of personal information to the user's mobile phone through the mobile phone network for storage on the user's mobile phone using the second software module residing on the phone;

decrypting the fraction of the second set of personal information;

using the second software module residing on the phone, organizing the fraction of the second set of personal information based on topic;

using the second software module residing on the phone, making the fraction of the second set of personal information accessible to the user based on the topic of the information; and repeating at least a plurality of times the receiving of the second set of personal information, the selecting of the fraction, the encrypting of the fraction, the transmitting of the fraction, the decrypting of the fraction, the organizing of the fraction, and the making the fraction accessible to the user, wherein the repeating includes synchronizing at least a portion of the fraction of the second set of personal information that is stored on the user's mobile phone with corresponding personal information that was already stored on the mobile phone, while maintaining the organization of the information based on the topic of the information.

\* \* \* \* \*